(12) United States Patent
Timurdogan et al.

(10) Patent No.: US 10,133,149 B2
(45) Date of Patent: Nov. 20, 2018

(54) APPARATUS AND METHODS FOR GENERATING NONLINEAR EFFECTS IN CENTROSYMMETRIC MATERIALS

(71) Applicant: Massachusetts Institute of Technology, Cambridge, MA (US)

(72) Inventors: Erman Timurdogan, Cambridge, MA (US); Michael R. Watts, Hingham, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 15/359,149

(22) Filed: Nov. 22, 2016

(65) Prior Publication Data

US 2017/0146887 A1 May 25, 2017

Related U.S. Application Data

(60) Provisional application No. 62/259,820, filed on Nov. 25, 2015, provisional application No. 62/307,749, filed on Mar. 14, 2016.

(51) Int. Cl.
*G02F 1/365* (2006.01)
*G02F 1/35* (2006.01)
(Continued)

(52) U.S. Cl.
CPC ............. *G02F 1/365* (2013.01); *G02B 6/122* (2013.01); *G02F 1/3534* (2013.01);
(Continued)

(58) Field of Classification Search
CPC ................. G02B 6/3536; G02F 1/3138; G02F 2201/122
See application file for complete search history.

(56) References Cited

U.S. PATENT DOCUMENTS 6,881,989 B2    4/2005  Kajii et al.
7,239,762 B2    7/2007  Kimerling et al.
(Continued)

OTHER PUBLICATIONS

Chmielak et al., "Pockels effect based fully integrated, strained silicon electro-optic modulator," Optics Express, vol. 19, No. 18, Aug. 29, 2011, 8 pages.
(Continued)

*Primary Examiner* — Ryan Lepisto
*Assistant Examiner* — Erin Chiem
(74) *Attorney, Agent, or Firm* — Smith Baluch LLP

(57) ABSTRACT

A waveguide includes an array of p-i-n junctions formed by ions implanted into the waveguide. The p-i-n junctions concentrate electric fields applied on the waveguide to convert the third order susceptibility $\chi^{(3)}$ into the second order susceptibility $\chi^{(2)}$ and induce the DC Kerr effect. The periodic electrical fields concentrated by the p-i-n junctions effectively create a wave vector, which together with the wave vectors of optical beams in the waveguide satisfies phase matching conditions for nonlinear optical effects. The phase matching can significantly enhance the efficiency of the nonlinear optical effects, such as second harmonic generation, sum frequency generation, difference frequency generation, and four-wave mixing. Waveguides with arrays of PIN junctions can also be used in phase modulators, amplitude modulators, and filters.

25 Claims, 36 Drawing Sheets

(51) Int. Cl.
  *G02B 6/122* (2006.01)
  *G02F 1/355* (2006.01)
  *G02F 1/377* (2006.01)
  *G02B 6/12* (2006.01)

(52) U.S. Cl.
  CPC ............ *G02F 1/3556* (2013.01); *G02F 1/377* (2013.01); *G02B 2006/12061* (2013.01); *G02F 1/3544* (2013.01); *G02F 2001/3548* (2013.01)

(56) References Cited

U.S. PATENT DOCUMENTS

| | | | |
|---|---|---|---|
| 7,907,848 B1* | 3/2011 | Soref | H04B 10/25 359/244 |
| 8,380,016 B1 | 2/2013 | Hochberg et al. | |
| 2013/0209023 A1 | 8/2013 | Prosyk | |
| 2015/0226987 A1* | 8/2015 | Park | G02B 6/125 385/2 |

OTHER PUBLICATIONS

International Search Report and Written Opinion in PCT/US16/63299, dated Feb. 9, 2017, 10 pages.
Avrutsky, I. et al., "Phase-matched sum frequency generation in strained silicon waveguides using their second-order nonlinear optical susceptibility," Optics Express, vol. 19, No. 22, pp. 21707-21716 (2011).
Bortz, M. L. et al., "Noncritical Quasi-Phase-Matched Second Harmonic Generation in an Annealed Proton-Exchanged $LiNbO_3$ Waveguide," IEEE Transactions on Quantum Electronics, vol. 30, No. 12, pp. 2953-2960 (1994).
Cada, M. et al., "Optical Wave Propagation in Kerr Media," Chapter 7; http://dx.doi.org/10.5772/51293, 18 pages (2013).
Cazzanelli, M. et al., "Second-harmonic generation in silicon waveguides strained by silicon nitride," Nature Materials, vol. 11, pp. 148-154 (2012).
Dulkeith, E. et al., "Self-phase-modulation in submicron silicon-on-insulator photonic wires," Optics Express, vol. 14, No. 12, pp. 5524-5534 (2006).
Green, W. M. J. et al., "Ultra-compact, low RF power, 10 Gb/s silicon Mach-Zehnder modulator," Optics Express, vol. 15, No. 25, pp. 17106-17113 (2007).
Heinz, T. F., "Second-Order nonlinear Optical Effects at Surfaces and Interfaces," Nonlinear Surface Electromagnetic Phenomena, H.—E. Ponath et al. (Eds.), pp. 353-416 (1991).
Hon, N. K. et al., "The third-order nonlinear optical coefficients of Si, Ge, and $Si_{1-x}Ge_x$ in the midwave and longwave infrared," Journal of Applied Physics, 110(1), 011301; doi: 10.1063/1.3592270, 9 pages (2011).
Kuo, P. S. et al., "Second-harmonic generation using 4-quasi-phasematching in a GaAs whispering-gallery-mode microcavity," Nature Communications, 5:3109; doi: 10.1038/ncomms4109, 7 pages (2014).
Levy, J. S. et al., "Harmonic generation in silicon nitride ring resonators," Optics Express, vol. 19, No. 12, pp. 11415-11421 (2011).
Lüpke, G., "Characterization of semiconductor interfaces by second-harmonic generation," Surface Science Reports, vol. 35, pp. 75-161 (1999).
Maker, P. D. et al., "Study of optical effects due to an induced polarization third order in the electric field strength," Physical Review, vol. 137, No. 3A, pp. A801-A818 (1965).
Popović, M., "Complex-frequency leaky mode computations using PML boundary layers for dielectric resonant structures," in Proceedings of Integrated Photonics Research, 3 pages (2003).
Qasymeh, M. et al., "Quadratic Electro-Optic Kerr Effect: Applications to Photonic Devices," IEEE Journal of Quantum Electronics, vol. 44, No. 8, pp. 740-746 (2008).
Soref, R. A. et al., "Electrooptical Effects in Silicon," IEEE Journal of Quantum Electronics, vol. QE-23, No. 1, pp. 123-129 (1987).
Sutherland, R. L., "Handbook of Nonlinear Optics," Chapter 7, CRC Press, 83 pages (2003).
Szilagyi, A. et al., "A quasi-phase-matching technique for efficient optical mixing and frequency doubling," Journal of Applied Physics, 47:2025; doi: 10.1063/1.322930, 9 pages (1976).
Timurdogan, E. et al., "An ultralow power athermal silicon modulator," Nature Communications, 5:4008; doi: 10.1038/ncomms5008, 11 pages (2014).
Watts, M. R. et al., "Low-voltage, compact, depletion-mode, silicon Mach-Zehnder modulator," IEEE Journal of Selected Topics in quantum Electronics, vol. 16, No. 1, pp. 159-164 (2010).
Watts, M. R. et al., "Vertical junction silicon microdisk modulators and switches," Optics Express, vol. 19, No. 22, pp. 21989-22003 (2011).
Xiong, C. et al., "Integrated GaN photonic circuits on silicon (100) for second harmonic generation," Optics Express, vol. 19, No. 11, pp. 10462-10470 (2011).
Xu, Q. et al., "Micrometre-scale silicon electrooptic modulator," Nature, vol. 435, pp. 325-327 (2005).

\* cited by examiner

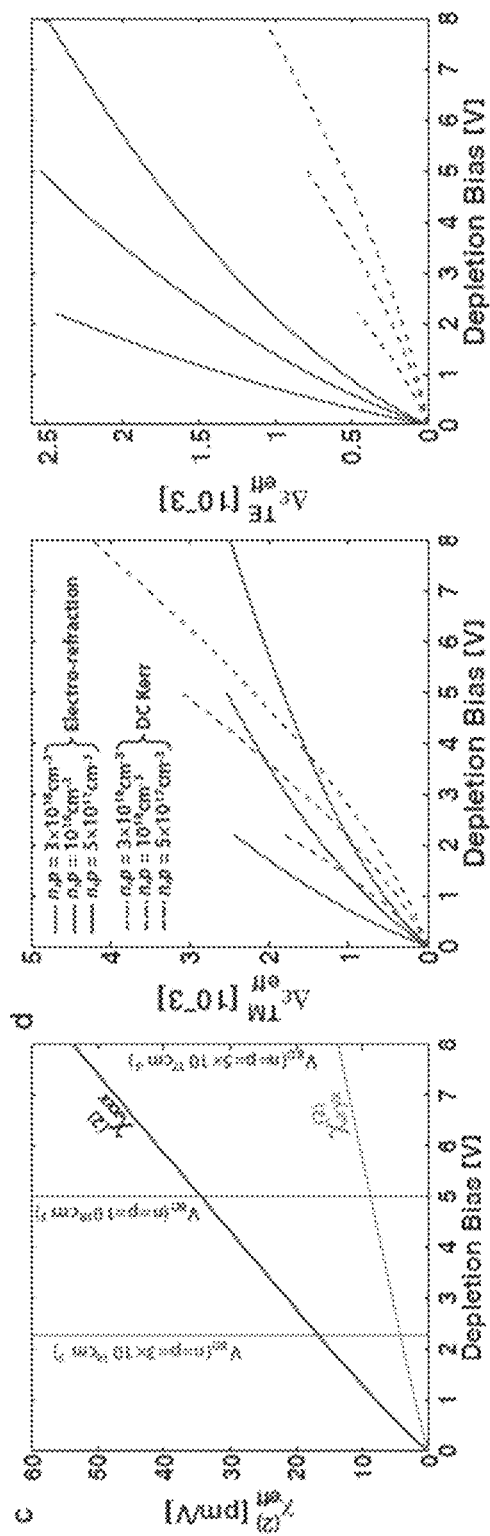

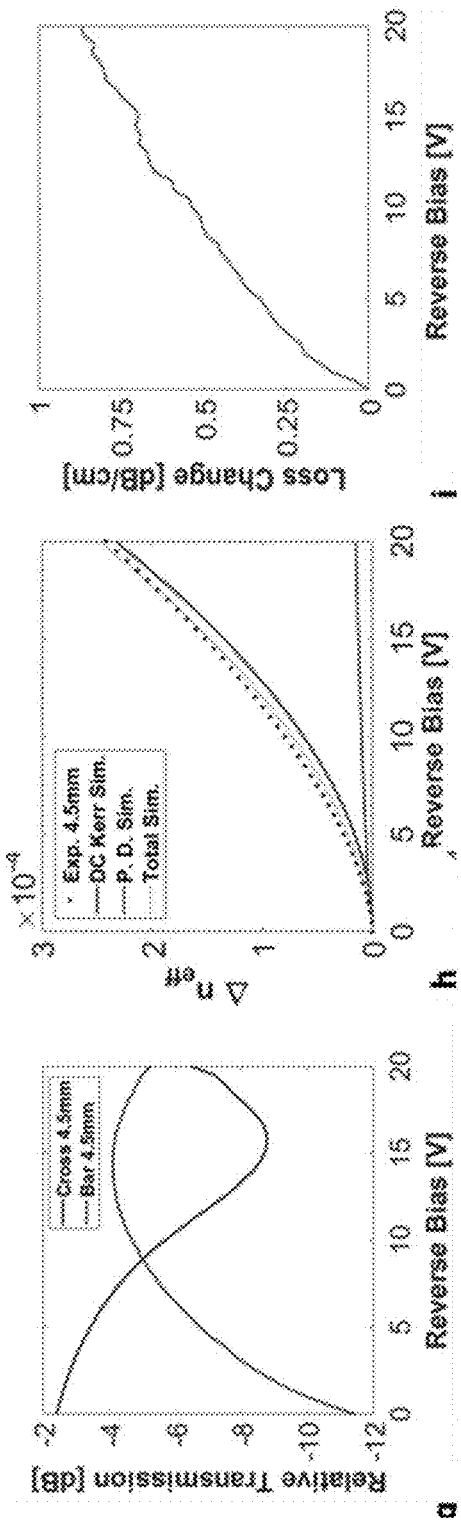

APPARATUS AND METHODS FOR GENERATING NONLINEAR EFFECTS IN CENTROSYMMETRIC MATERIALS

CROSS-REFERENCES TO RELATED APPLICATIONS

This application claims priority to U.S. provisional application Ser. No. 62/259,820, filed Nov. 25, 2015, entitled "ON-CHIP ELECTRIC FIELD INDUCED NONLINEAR EFFECTS ON SILICON," which is hereby incorporated herein by reference in its entirety. This application also claims priority to U.S. provisional application Ser. No. 62/307,749, filed Mar. 14, 2016, entitled "ON-CHIP ELECTRIC FIELD INDUCED NONLINEAR EFFECTS ON SILICON," which is hereby incorporated herein by reference in its entirety.

GOVERNMENT SUPPORT

This invention was made with Government support under Grant No. HR0011-12-2-0007 awarded by the Defense Advanced Research Projects Agency. The Government has certain rights in the invention.

BACKGROUND

Silicon is one of the most widely used materials in modern photonics and is the main building block within the electronic complementary-metal-oxide-semiconductor (CMOS) process. However, silicon is also a centrosymmetric media, in which second order nonlinear susceptibility ($\chi^{(2)}$) is typically inhibited in the electric-dipole approximation. As a result, it can be challenging to induce nonlinear optical processes based on $\chi^{(2)}$, such as second harmonic generation (SHG), sum frequency generation, difference frequency generation, and four wave mixing (e.g. linear electro-optic effects), in silicon devices.

The electro-refractive effect (also referred to as plasma-dispersion effect) based on the change in free-carrier concentration may be utilized to initiate certain electro-optic processes in silicon. As the free-carrier concentration changes in a silicon waveguide, the material polarization can also alter, thereby changing the electric permittivity of silicon. However, this electro-refractive effect is usually still weak (e.g., $\Delta n_{Si} < 10^{-3}$), compared to nonlinear crystals, such as $LiNbO_3$.

One way to increase the electro-refractive effect in silicon is to integrate p-n junctions into compact resonant micro-ring and Mach-Zehnder modulators. By applying a positive or negative bias to these junctions, the free-carriers can be rapidly injected or depleted to modulate the permittivity of silicon. The modulation of the permittivity can in turn induce a phase change in a resonator cavity and an arm of a Mach-Zehnder interferometer, leading to the amplitude modulation of a continuous wave laser at the output of a resonant and a Mach-Zehnder modulator, respectively. In injection based modulators, bandwidths of these modulators can be limited by the free-carrier lifetime in silicon (e.g., $\tau \sim 1$ ns or $1/\tau \sim 1$ GHz), and the power consumption is typically on the order of a pico-joule-per-bit. The electrical bandwidths of the silicon modulators may be extended by depleting carriers (e.g., $f_{3\,dB} > 20$ GHz) and power consumption of the modulation can be reduced down to a single femto-joule-per-bit. However, this improvement usually comes at a price of high free-carrier loss and large capacitance per-unit-volume. This can impose a trade-off between the device bandwidth and power consumption.

Alternatively, nonlinear electro-optic effects based on second and third order susceptibilities can scale with the applied electric field and usually do not impose a trade-off like the electro-refractive effect. In fact, the upper limit of the nonlinear electro-optic effect is imposed only by the silicon breakdown field which is $E_b \sim 6 \times 10^7$ V/m.

One approach for generating the electro-optic effect in silicon includes depositing a SiN stressor layer on a silicon waveguide to induce large stress gradients. Silicon waveguides formed using this method can have Pockel's like modulation up to about 500 KHz with an applied voltage of 30 Vpp for a <122 pm/V and second harmonic generation ($P_{2\omega}/P_\omega = -73$ dB) for a $\chi^{(2)} \sim 44$ pm/V. However, introduction of stressor SiN layer can add process complexity and limit the electro-optic design.

Another approach for generating electro-optic effect in silicon is converting the third order non-linear susceptibility $\chi^{(3)}$ to second order non-linear susceptibility $\chi^{(2)}$ by the external static or low frequency electric field. An external electric field can be applied to orient dipole moments in the direction of this field, breaking the crystalline symmetry. This effect, also referred as the "electro-optic DC Kerr effect" or "quadratic field effect", can be conveniently generated in silicon, because silicon exhibits a large $\chi^{(3)}$ compared to other CMOS compatible materials, such as SiN and $SiO_2$. In addition, ion implantation can be used to form junctions in silicon, allowing concentration of large electrical fields within silicon and elimination of external electrodes. The field induced $\chi^{(2)}$ can be observed in the form of second harmonic generation (SHG). However, SHG efficiency can be relatively low due to the lack of phase matching in silicon waveguides and losses at the operating wavelength.

SUMMARY

Embodiments of the present invention include apparatus, systems, and methods of for generating nonlinear effects in centrosymmetric materials such as silicon. In one example, an apparatus includes a waveguide including a centrosymmetric material to guide at least one light beam. The waveguide includes a plurality of p-type regions comprising a p-type material on a first side of the waveguide and a plurality of n-type regions comprising an n-type material on a second side, opposite the first side, of the waveguide. The apparatus also includes a first electrode in electrical communication with the plurality of p-type regions and a second electrode, in electrical communication with the plurality of n-type regions. The two electrodes apply a voltage between the first electrode and the second electrode so as to increase a second order susceptibility of the centrosymmetric material.

In another example, a method includes guiding at least one light beam in a waveguide formed of centrosymmetric material. The waveguide includes a plurality of p-type regions comprising a p-type material on a first side of the waveguide and a plurality of n-type regions comprising an n-type material on a second side, opposite the first side, of the waveguide. The method also includes applying a voltage between the plurality of p-type regions and the plurality of n-type regions to increase a second order susceptibility of the centrosymmetric material.

In yet another example, an apparatus includes a light source to emit a pump beam having a first frequency $\omega$ and a first wave vector $k_\omega$. A silicon waveguide is in optical communication with the light source to guide the pump beam. The silicon waveguide includes a plurality of p-type regions arrayed at a period Λ on a first side of the silicon waveguide and a plurality of n-type regions arrayed at a period Λ on a second side, opposite the first side, of the silicon waveguide so as to form a plurality of PIN junctions with the silicon waveguide. The apparatus also includes a first electrode in electrical communication with the plurality of p-type regions and a second electrode, in electrical communication with the plurality of n-type regions, to apply a voltage to the plurality of PIN junctions, the voltage increasing a second order susceptibility of the silicon waveguide.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 13A shows calculated effective second order non-linearity as a function of bias voltage in the p-n vertical junction silicon waveguide illustrated in FIG. 12A.

FIGS. 13B and 13C show the relative DC Kerr permittivities for TE and TM polarizations, respectively, as a function of bias voltage in the p-n vertical junction silicon waveguide illustrated in FIG. 12A.

FIG. 20A shows the measured transmission spectra of the bar and cross ports of an MZI with a first intrinsic region width $w_i^1$ and 4.5 mm long phase shifter as a function of DC bias.

FIG. 20B shows the measured refractive index perturbation as a function of DC bias for the MZI with an intrinsic region $w_i^1$.

FIG. 20C shows the loss change as a function of applied bias when the phase shifter waveguide with an intrinsic region $w_i^1$ is characterized as a straight waveguide.

DETAILED DESCRIPTION

Apparatus for Nonlinear Optical Effects in Centrosymmetric Materials

To increase the efficiency of nonlinear effects based on second order susceptibility in centrosymmetric materials, apparatus, systems, and methods described herein employ periodic electrical fields applied over a waveguide to induce nonlinear electro-optic (DC Kerr, second harmonic generation, sum frequency generation, difference frequency generation) effect with phase matching. The waveguide is implanted with ions to form compact p-i-n junctions, which concentrate electric fields to convert the third order susceptibility $\chi^{(3)}$ into the second order susceptibility $\chi^{(2)}$. The periodic electrical fields concentrated by the p-i-n junctions effectively create a wave vector, which together with the wave vectors of optical beams in the waveguide achieve phase matching. As a result, the efficiency of nonlinear effects, such as second harmonic generation, sum frequency generation, difference frequency generation, and four wave mixing, can be significantly enhanced.

Figure 1A:
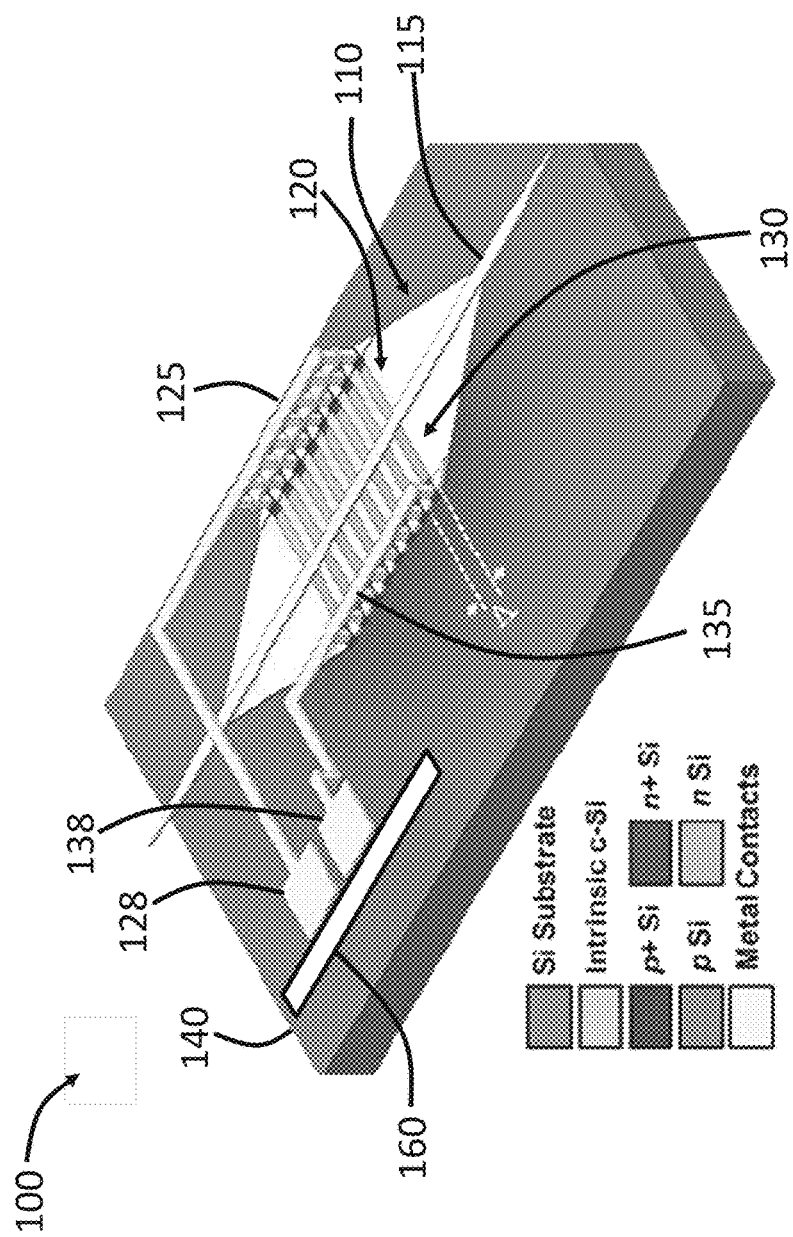
FIGS. 1A-1C show schematics of an apparatus use generate nonlinear optical effects in centrosymmetric materials.
Figure 1B:
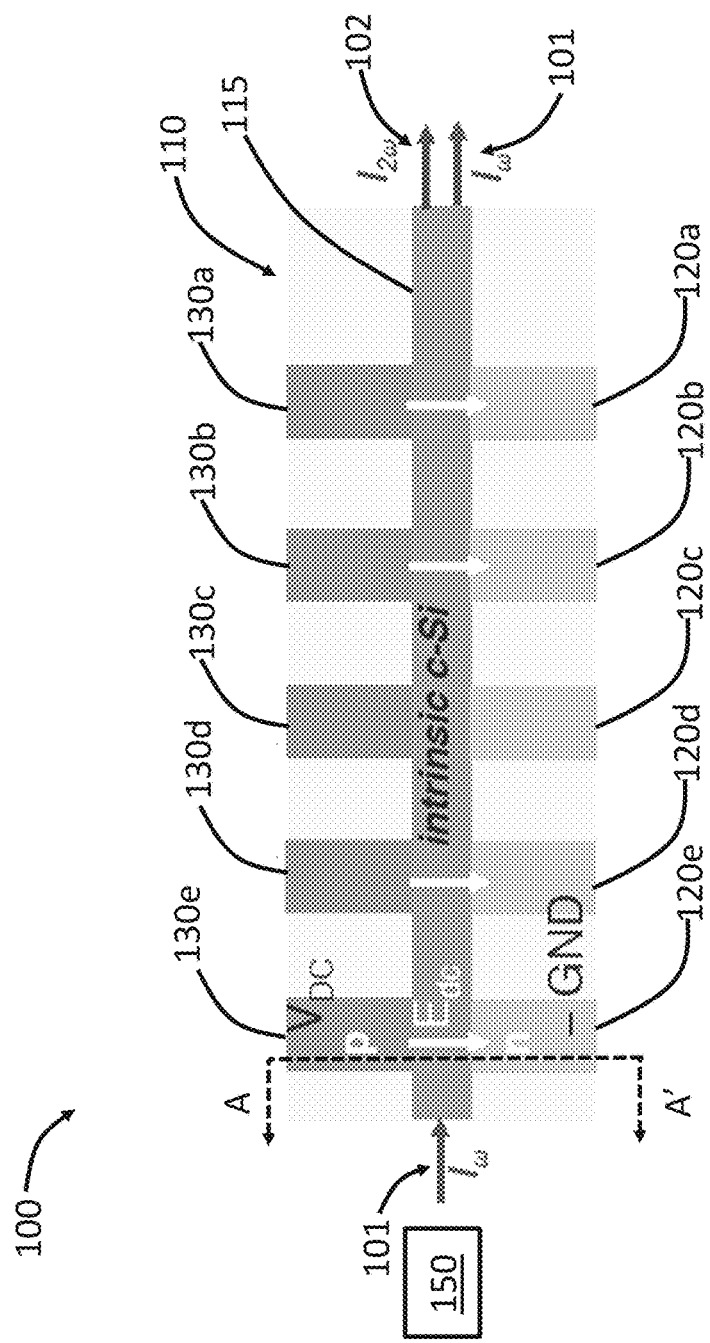
Figure 1C:
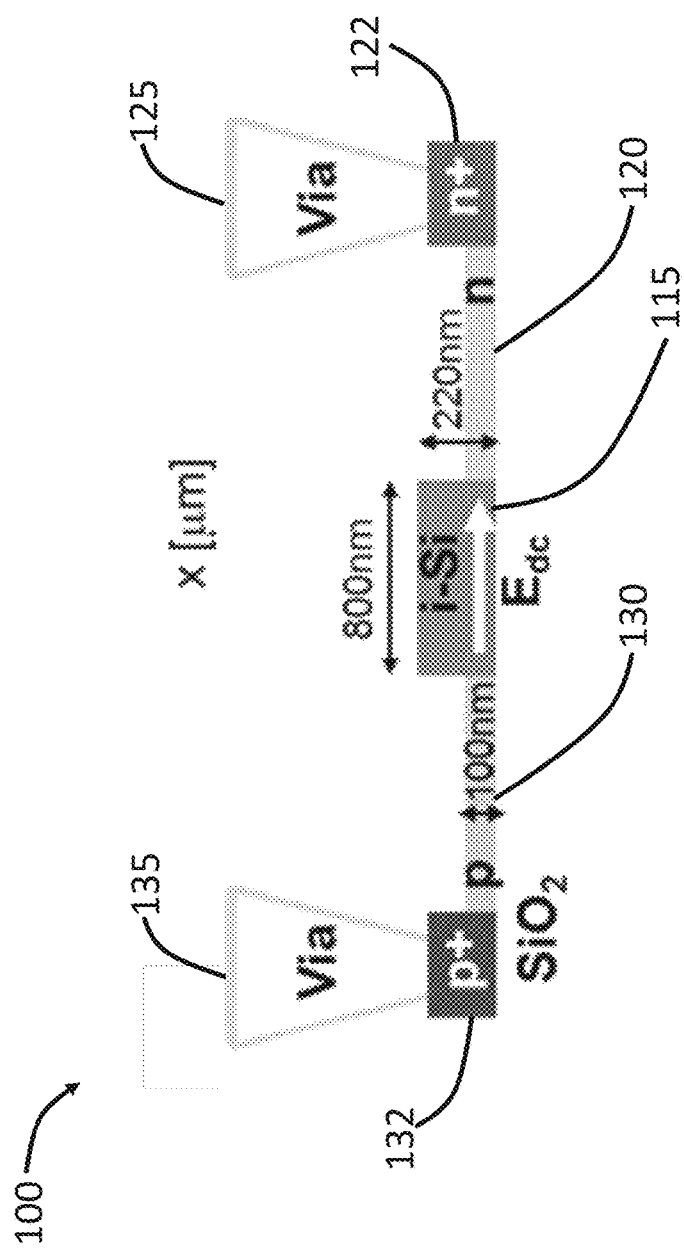

FIGS. 1A-1C show schematics of an apparatus 100 to generate and enhance nonlinear optical effects in centrosymmetric materials. The apparatus 100 includes a waveguide 110 disposed on a substrate 140. The waveguide 110 includes a waveguide core 115 made of a centrosymmetric material (e.g., silicon) and disposed between an array of n-type regions 120 and an array of p-type regions 130. As shown in FIG. 1B, the array of n-type regions 120 includes n-type regions 120a, 120b, 120c, 120d, and 120e. Similarly, the p-type regions 130 include p-type regions 130a, 130b, 130c, 130d, and 130e. Each n-type region (120a to 120e) is disposed opposite a corresponding p-type region (130a to 130e) such that they form a PIN junction with the waveguide core 115 in the middle. For example, the n-type region 120a, the p-type region 130a, and the portion of the waveguide core 115 between the n-type region 120a and the p-type region 130a form a first PIN junction. Similarly, the n-type region 120b, the p-type region 130b, and the portion of the waveguide core 115 between the n-type region 120b and the p-type region 130b form a second PIN junction.

The array of n-type regions 120 are connected to a first electrode 125 and the array of p-type regions 130 are connected to a second electrode 135. The connection between the n-type regions 120 and the first electrode 125 can be achieved via an n+ region 122 (see FIG. 1C). Similarly, the connection between the p-type regions 130 and the second electrode 135 can be achieved via a p+ region 132. A first electrical contact 128 is electrically coupled to the first electrode 125 and a second electrical contact 138 is electrically coupled to the second electrode 135. The two electrical contacts 128 and 138 can connect the apparatus 100 to external devices such as a voltage source 160.

In operation, the waveguide core 115 receives and guides a light beam 101 provided by a light source 150, such as a laser integrated onto the substrate 140. The voltage source 160 supplies a voltage and accordingly an electrical field between the array of n-type regions 120 and the array of p-type regions 130. The PIN junctions formed by the array of n-type regions 120, the array of p-type regions 130, and the waveguide core 115 can significantly enhance the electrical field within the waveguide core 115, thereby increasing the second order susceptibility of the centrosymmetric material in the waveguide core 115. The increased second order susceptibility of the centrosymmetric material, in turn, can induce various types of optical nonlinear effects in the waveguide 110, such as phase shifting, second harmonic generation, sum frequency generation, difference frequency generation, and four wave mixing, among others.

In addition to enhancing electrical fields in the waveguide core 115, the PIN junctions formed by the array of n-type regions 120, the array of p-type regions 130, and the waveguide core 115 also introduce a wave vector $k_{PIN}$ that can satisfy phase matching conditions of nonlinear optical effects. Without being bound by any particular theory or mode of operation, the wave vector $k_{PIN}$ of the electrical field in the waveguide core 115 depends on the period (also referred to as the pitch or periodicity) of the array of p-type regions 130 and the n-type regions 130 and can be written as $k_{PIN}=2\pi/\Lambda$. Therefore, by tuning the period of the array of n-type regions 120 and the p-type regions 130, different wave vectors can be generated to satisfy phase matching conditions of different nonlinear optical effects.

In general, the period $\Lambda$ of the n-type regions 120 and the p-type regions 130 (also collectively referred to as the doped regions 120 and 130) can be selected based on the wave vectors of light beams participating in the nonlinear optical effects. For example, as shown in FIG. 1B, the waveguide 110 guides the light beam 101 (also referred to as the fundamental beam) at a frequency $\omega$ and generates a second harmonic beam 102 at a frequency $2\omega$. The light beam 101 has a wave vector $k_\omega$ and the second harmonic beam 102 has a wave vector $k_{2\omega}$. In this case, the period of the n-type regions 120 and the p-type regions 130 can be set as $\Lambda=2\pi/(2k_\omega-k_{2\omega})$, thereby satisfying phase matching conditions for second harmonic generation. Other examples of the period $\Lambda$ are described below with reference to FIGS. 3-8.

In practice, the period $\Lambda$ can be about 100 nm to about 10 mm (e.g., about 100 nm, about 200 nm, about 500 nm, about 1 μm, about 2 μm, about 5 μm, about 10 μm, about 20 μm, about 50 μm, about 100 μm, about 200 μm, about 500 μm, about 1 mm, about 2 mm, about 5 mm, or about 10 mm, including any values and sub ranges in between).

The apparatus 100 can be configured to generated and/or enhance nonlinear optical effects in various types of centrosymmetric materials. In one example, the waveguide core 115 can include silicon (e.g., intrinsic silicon). In this case, the p-type regions 130 can include silicon doped with a p-type dopant, such as boron, aluminium, nitrogen, gallium, indium, or any other p-type dopant known in the art. The n-type regions 120 can include silicon doped with an n-type dopant, such as phosphorous, arsenic, antimony, bismuth, lithium, or any other n-type dopant known in the art.

In another example, the waveguide core 115 can include germanium. In yet another example, the waveguide core 115 can include diamond. In yet another example, the waveguide core 115 can include silicon nitride, such as SiN. In yet another example, the waveguide core 115 can include silicon oxide, such as $SiO_2$.

In one example, the n-type regions 120 and the p-type regions 130 are part of the waveguide 110. In this case, the waveguide core 115 can be made of an intrinsic semiconductor material (e.g., silicon), whereas the doped regions 120 and 130 include the same intrinsic semiconductor material doped with a corresponding type of dopant (n-type and p-type respectively). The PIN junctions formed by the doped regions 120 and 130 and the waveguide core 115 can be homojunctions.

In another example the doped regions (120 and 130) and the waveguide 110 can be separate components. For example, the waveguide core 115 can be fabricated from one material, while the doped portions 120 and 130 can be fabricated from another material doped with corresponding dopants. In this case, the PIN junctions formed by the doped regions 120 and 130 and the waveguide core 115 can be heterojunctions. In either example, the dopant concentration in the doped regions 120 and 130 can be about $10^{15}/cm^3$ to about $10^{20}$ $cm^3$ (e.g., about $10^{15}/cm^3$, about $10^{16}/cm^3$, about $10^{17}/cm^3$, about $10^{18}/cm^3$, $10^{19}/cm^3$, or about $10^{20}/cm^3$, including any values and sub ranges in between).

The dimensions of the waveguide core 115 can depend on the desired operating wavelength of the apparatus 100. In one example, the operating wavelength of the apparatus 100 can be the wavelength of the light beam 101. In another example, the operating wavelength of the apparatus 100 can be the wavelength of the second harmonic beam 102. In yet another example, the apparatus 100 can have more than operating wavelength (e.g., the wavelengths of both the first beam 101 and the second beam 102).

In one example, the waveguide core 115 can be configured as a single-mode waveguide for the light beam 101 and/or the second harmonic beam 102. In another example, the waveguide core 115 can be configured as a multi-mode waveguide for the light beam 101 and/or the second harmonic beam 102.

The height of the waveguide core 115 can be about 50 nm to about 20 µm (e.g., about 50 nm, about 10 nm, about 200 nm, about 500 nm, about 1 µm, about 2 µm, about 5 µm, about 10 µm, about 15 µm, or about 20 µm, including any values and sub ranges in between). The width of the waveguide core 115 can also be about 50 nm to about 20 µm (e.g., about 50 nm, about 10 nm, about 200 nm, about 500 nm, about 1 µm, about 2 µm, about 5 µm, about 10 µm, about 15 µm, or about 20 µm, including any values and sub ranges in between).

In one example, the height (or thickness) of the doped regions 120 and 130 can be less than the height of the waveguide core 115 (as shown in FIG. 1C). In another example, the height of the doped regions 120 and 130 can be substantially similar to the height of the waveguide core 115. In yet another example, the height (or thickness) of the doped regions 120 and 130 can be greater than the height of the waveguide core 115. In practice, the height of the doped regions 120 and 130 can be about 20 nm to about 20 µm (e.g., about 20 µm, about 50 nm, about 10 nm, about 200 nm, about 500 nm, about 1 µm, about 2 µm, about 5 µm, about 10 µm, about 15 µm, or about 20 µm, including any values and sub ranges in between).

The length of the doped regions 120 and 130, defined as the distance between the waveguide core 115 and the respective electrode 125 and 135, can be about 5 nm to 5 µm (e.g., about 5 nm, about 10 nm, about 20 nm, about 50 nm, about 100 nm, about 200 nm, about 500 nm, about 1 µm, about 2 µm, about 3 µm, about 4 µm, or about 5 µm, including any values and sub ranges in between).

In one example, the light source 150 is optional and users of the apparatus 100 can provide their own light source to deliver the light beam 101. In another example, the light source 150 can be part of the apparatus 150. For example, the light source 150 can be a semiconductor laser fabricated on or in the substrate 140 such that the entire apparatus 100 can be compact and portable.

In one example, the light source 150 can be a continuous wave (CW) light source and the light beam 101 is accordingly a CW light beam. In another example, the light source 150 can be pulsed mode light source and the light beam 101 accordingly includes a train of light pulses. Examples of light sources that can be used include, but not limited to, gas lasers (e.g., HeNe laser, Argon laser, etc.), solid state lasers (Nd:YAG laser, Ti:sapphire laser, etc.), semiconductor laser (GaN laser, InGaN laser, InGaAsP laser, etc.), quantum cascade lasers, fiber laser (e.g., Yb glass fiber lasers), light emitting diodes (LEDs), organic light emitted diodes (OLEDs), or any other light source that is appropriate.

The wavelength of the light beam 101 can be about 0.6 µm to about 20 µm (e.g., about 0.6 µm, 0.7 µm, about 0.8 µm, about 0.9 µm, about 1 µm, about 2 µm, about 3 µm, about 4 µm, about 5 µm, about 7.5 µm, about 10 µm, about 15 µm, or about 20 µm, including any values and sub ranges in between). The wavelength of the second harmonic beam 102 accordingly is half the wavelength of the light beam 101.

The voltage source 160 can include any type of voltage sources known in the art. The voltage applied between the electrodes 125 and 135 can be about 1V to about 25 V (e.g., about 1 V, about 2 V, about 5 V, about 10 V, about 15 V, about 20 V, or about 25 V, including any values and sub ranges in between).

Figure 2:
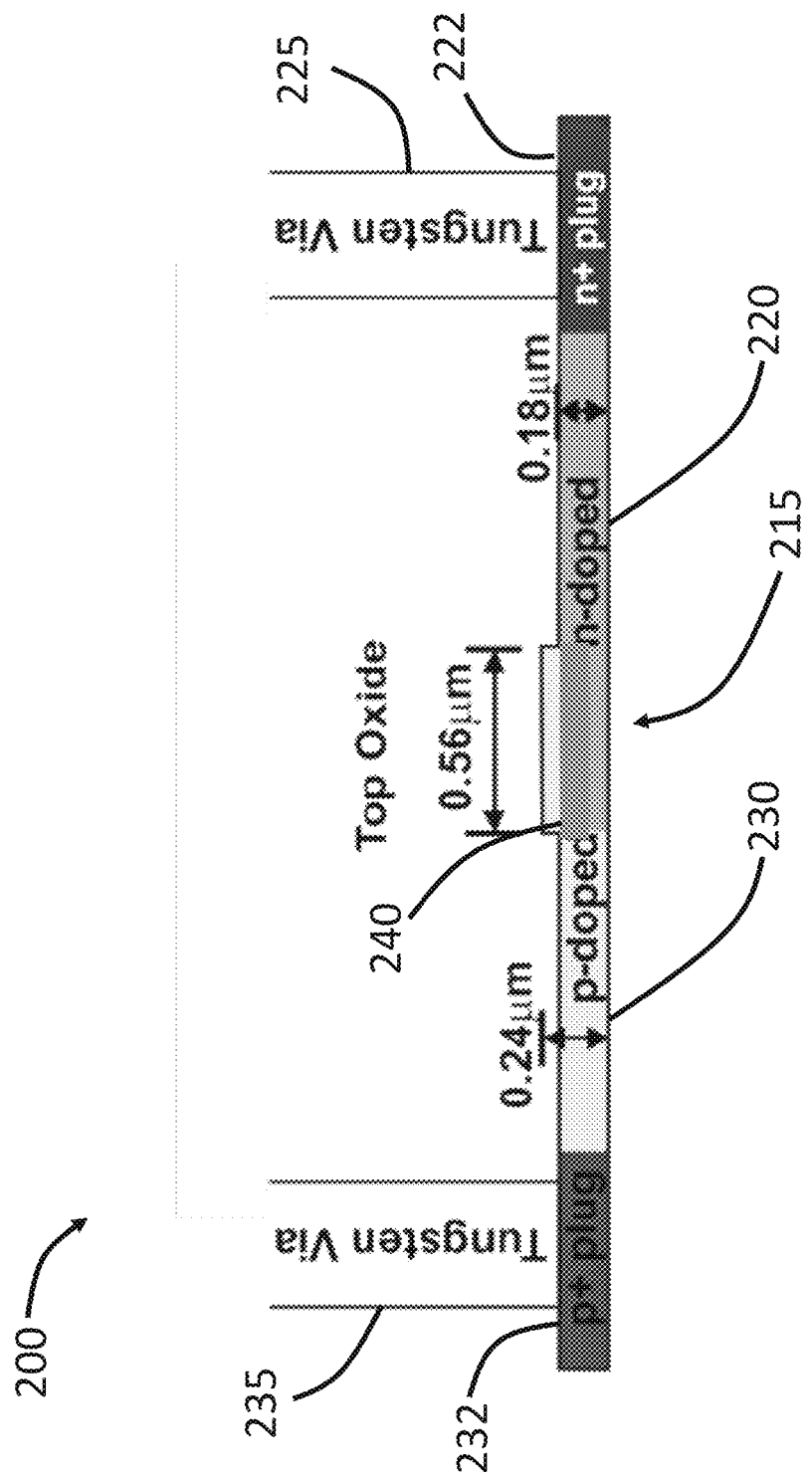
FIG. 2 shows a cross section of an apparatus to use nonlinear optical effects in centrosymmetric materials.

FIG. 2 shows a side view of an apparatus 200 to generate nonlinear optical effects in centrosymmetric materials. The apparatus 200 includes a waveguide core 215 disposed between an array of n-type regions 220 (one n-type region is shown for illustration) and an array of p-type regions 230 (one n-type region is shown for illustration). The array of n-type regions 220 is coupled to an n+ plug 222, which in turn is connected to a tungsten electrode 225 (also referred to as a tungsten via). Similarly, the array of p-type regions 230 is coupled to a p+ plug 232, which in turn is connected to another tungsten electrode 235. Voltage can be applied to the n-type regions 220 and the p-type regions via the two tungsten electrodes 225 and 235. The generated vertical electric field can align with transverse-magnetic polarization of the light beam propagating in the waveguide core 215, producing an improved response for this polarization. The waveguide core 215 in the apparatus 200 is made of doped semiconductors. The top portion of the waveguide core 215 is made of the p-doped material in the p-type region 230 and the bottom portion of the waveguide core 215 is made of the n-doped material in the n-type region 220, and there is a depletion region 240 between the p-type region 230 and n-type region 220.

Figure 3:
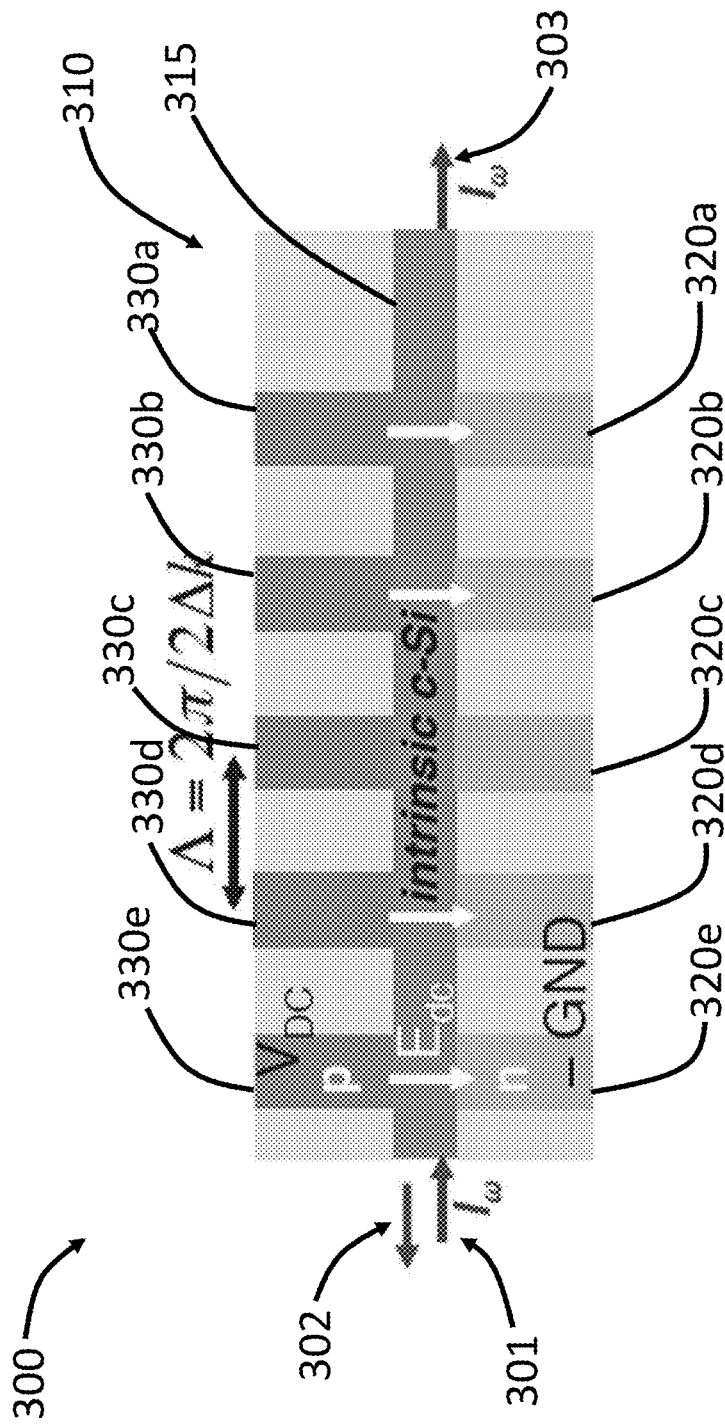
FIG. 3 shows a top view of an apparatus for filtering optical beams using centrosymmetric materials.

FIG. 3 shows a top view of an apparatus 300 for filtering optical beams using centrosymmetric materials. The apparatus 300 includes a waveguide 310, which includes a waveguide core 315 disposed between an array of n-type regions 320 (including regions 320a, 320b, 320c, 320d, and 320e) and an array of p-type regions 330 (including regions 330a, 330b, 330c, 330d, and 330e). In operation, a direct current (DC) voltage is applied between the n-type regions 320 and the p-type regions 330. The waveguide core 315 guides a light beam 301, transmitting a portion of the light beam 301 (denoted as a transmitted beam 303 or a forward beam 303) and reflecting another portion of the light beam 301 (denoted as a reflected beam 302 or a backward beam 302).

Quasi-phase matching between the backward beam 302 and the forward beam 303 can be written as $k_{\omega b}+k_{\omega f}-2\Delta k=0$, where $k_{\omega b}$ is the wave vector of the backward beam 302 in the waveguide 310 and $k_{\omega f}$ is the wave vector of the forward beam 303. To satisfy this phase matching condition, the period of the n-type regions 320 and the p-type regions 330 can be set as $\Lambda=\pi/\Delta k$. The reflection strength of the apparatus 300 can be controlled by the applied DC bias voltage.

The apparatus 300 can also be configured as a wave plate (also referred to as a polarization rotator) to rotate the polarization of the light beam 301. In this case, the phase matching condition of the wave plate can be written as: $k^{TE}_{\omega}+k^{TM}_{\omega}-2\Delta k=0$, where $k^{TE}_{\omega}$ is the wave vector of the TE mode in the waveguide 310 and $k^{TM}_{\omega}$ is the wave vector of the TM mode in the waveguide 310. Accordingly, the period of the n-type regions 320 and the p-type regions 330 can be set as $\Lambda=\pi/\Delta k$. Nonlinear polarization rotation is commonly used for as a mechanism for mode locking, and the voltage controlled polarization rotation in the apparatus 300 can be employed to control threshold and mode locking laser repetition rate for adaptive mode locking.

Figure 4:
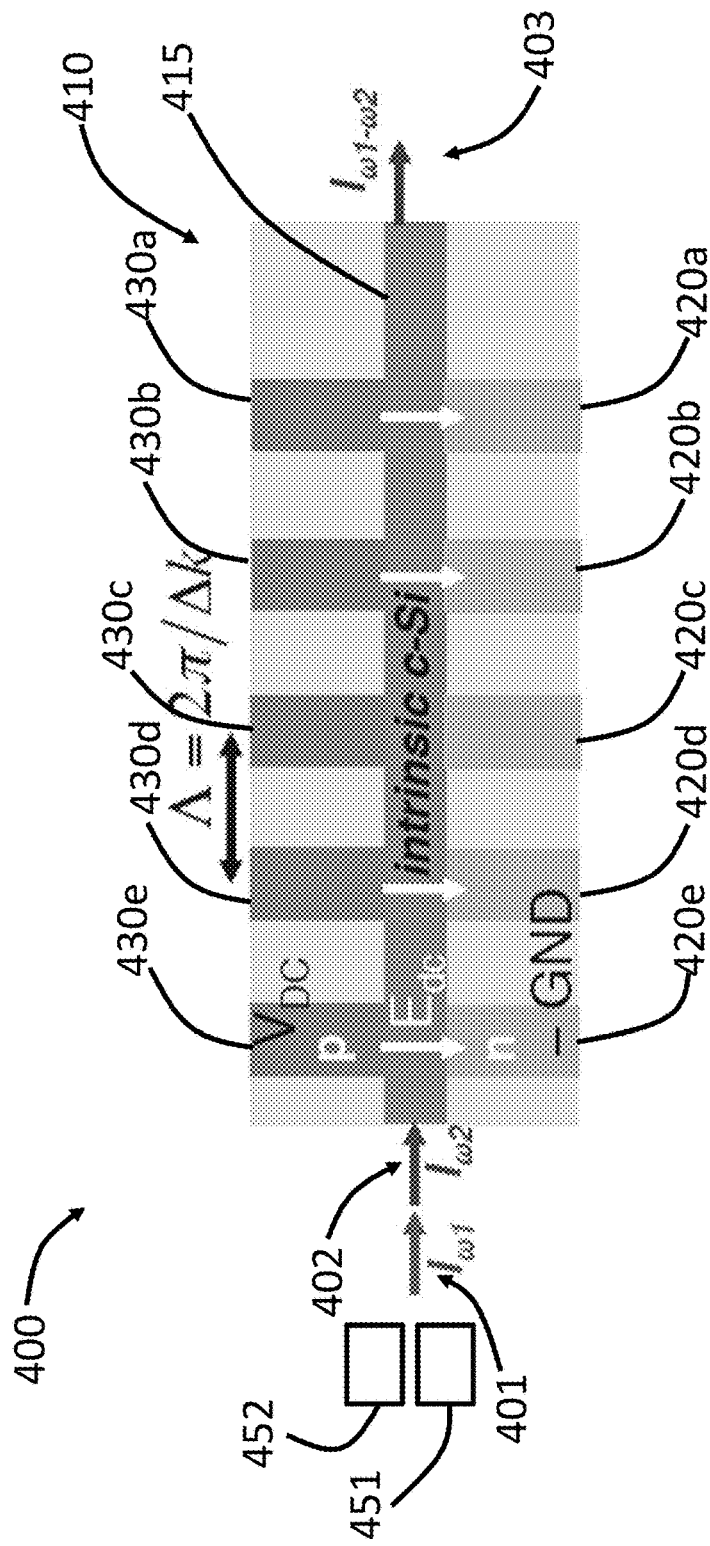
FIG. 4 shows a top view of an apparatus for difference frequency generation using nonlinear optical effects in centrosymmetric materials.

FIG. 4 shows a top view of an apparatus 400 for difference/sum frequency generation using centrosymmetric materials. The apparatus 400 includes a waveguide 410, which includes a waveguide core 415 disposed between an array of n-type regions 420 (including regions 420a, 420b, 420c, 420d, and 420e) and an array of p-type regions 430 (including regions 430a, 430b, 430c, 430d, and 430e). In operation, a direct current (DC) voltage is applied between the n-type regions 420 and the p-type regions 430. The waveguide 410 receives two light beams 401 (provided by a first light source 451) and 402 (provided by a second light source 452). The first light beam 401 has a first frequency $\omega_1$ and a first wave vector $k_{\omega 1}$. The second light beam 402 has a second frequency $\omega_2$ and a second wave vector $k_{\omega 2}$. The two light beams 401 and 402 can generate a third light beam 402 having a third frequency $\omega_3$ ($\omega_3=\omega_1-\omega_2$) and a third wave vector $k_{\omega 3}$ via a difference frequency generation process. The phase matching condition for difference frequency generation can be written as $k_{\omega 3}=k_{\omega 1}+k_{\omega 2}-\Delta k$. To satisfy this phase matching condition, the period $\Lambda$ of the n-type regions 420 and the p-type regions 430 can be set as $\Lambda=2\pi/((k_{\omega 1}+k_{\omega 2})-k_{\omega 3})$.

The apparatus 400 can also be configured as a sum frequency generator by changing the period $\Lambda$ of the n-type regions 420 and the p-type regions 430. In this case, the third frequency $\omega_3$ is $\omega_3=\omega_1+\omega_2$ and the wave vector of the third beam 403 is $k_{\omega 3}$. The period $\Lambda$ can be set as $\Lambda=2\pi/((k_{\omega 1}+k_{\omega 2})-k_{\omega 3})$.

The apparatus 400 can also be configured as a frequency shifter. In this case, a voltage source (now shown in FIG. 4) can be used to apply an alternating current (AC) voltage having an electrical frequency $\omega_{electrical}$. The interaction between the first light beam 401 and the AC electrical field can generate the second light beam 402, where $\omega_2=(\omega_1+\omega_{electrical})$ and $\Lambda=2\pi/((k_{\omega 1}+k_{electrical})-k_{\omega 2})$. In this case, the second light source 452 is optional.

Figure 5:
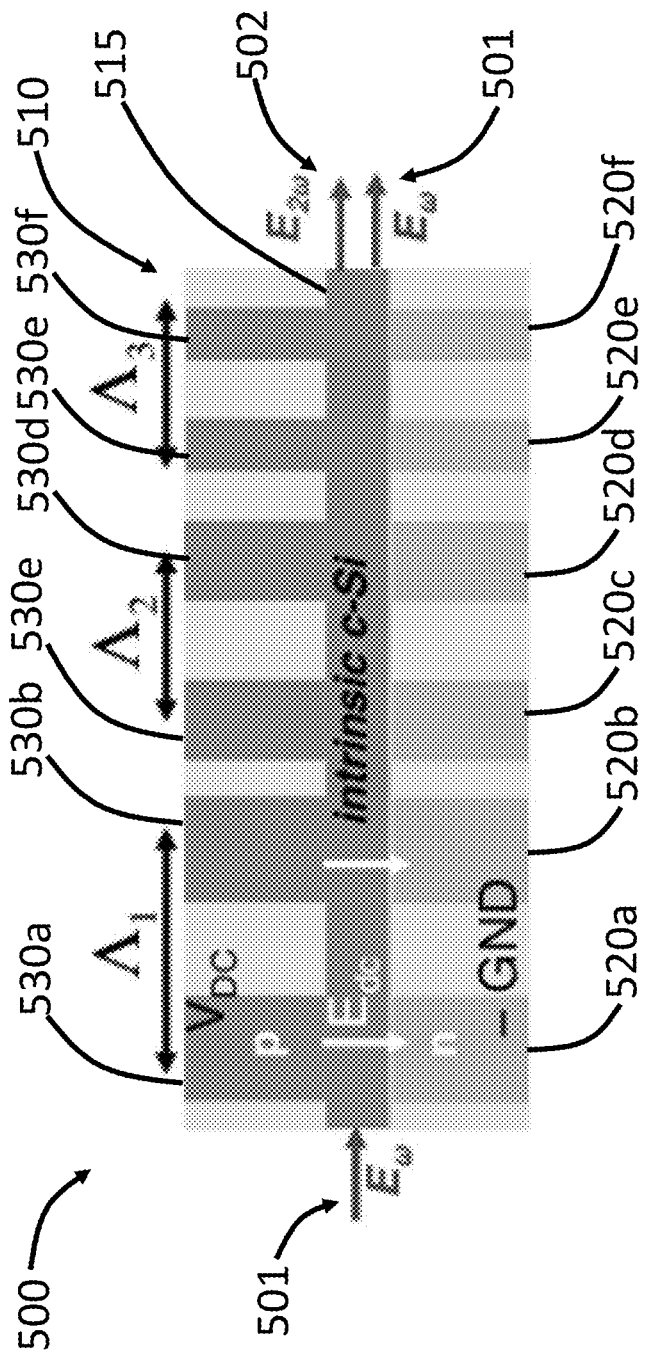
FIG. 5 shows a top view of a second harmonic generator including an array of PIN junctions having multiple periods for broadband frequency generation.

FIG. 5 shows a top view of an apparatus 500 including an array of PIN junctions having multiple periods for broadband frequency generation. The apparatus 500 includes a waveguide 510, which includes a waveguide core 515 disposed between an array of n-type regions 520 (including regions 520a, 520b, 520c, 520d, 520e, and 520f) and an array of p-type regions 530 (including regions 530a, 530b, 530c, 530d, 520e, and 530f). The array of n-type regions 520 includes several sub arrays: the n-type region 520a and 520b form a first sub array having a first period $\Lambda_1$, the n-type region 520c and 520d form a second sub array having a second period $\Lambda_2$, and the n-type region 520e and 520f form a third sub array having a third period $\Lambda_3$. Similarly, the array of p-type regions 530 also includes several sub arrays: a first sub array including p-type regions 530a and 530b having the first period $\Lambda_1$, a second sub array including p-type regions 530c and 530d having the second period $\Lambda_2$, and a third sub array including p-type regions 530e and 530f having the third period $\Lambda_3$.

Including more than one sub array of doped regions 520 and 530 can satisfy multiple phase matching conditions in a single device. For example, the apparatus 500 can be configured for broadband second harmonic generation. The input beam 510 can be a broadband light beam. Three different periods $\Lambda_1$ to $\Lambda_3$ can therefore satisfy three different phase matching conditions, thereby generating a second harmonic beam 502 including three spectral components at three different wavelengths. Alternatively, the input beam 510 can include three beams at three different wavelengths and the apparatus 500 can generate three second harmonic beams 502 from each of the input beams simultaneously.

FIG. 5 shows three different sub arrays for illustrative purposes. In practice, the number of sub arrays in the apparatus 500 can be greater than 3 (e.g., greater than 4, greater than 5, greater than 10, etc.). In addition, the number of doped regions in each sub array can also be greater than 2 (e.g., greater than 5, greater than 10, greater than 20, or more). In one example, different sub arrays include the same number of doped regions. In another example, different sub arrays can include different numbers of doped regions.

In one example, the apparatus 500 can include multiple sub arrays having a chirped period $\Lambda(x)=\Lambda_{ave}+\Lambda_{pk-pk}|\sin(2\pi x/L)|$, where x is the longitudinal location of the doped region 520/530, $\Lambda(x)$ is the period of the sub array at location x, L is the total length of the doped regions 520 and 530, $\Lambda_{ave}$ is the average period of all sub arrays in the doped regions 520 and 530, $\Lambda_{pk-pk}$ is amplitude of the period variation. This chirped period can help generate more uniform distribution of second harmonic power within the waveguide 510. In another example, the apparatus 500 can include multiple sub arrays having a linearly chirped period $\Lambda(x)=\Lambda_{ave}+\Lambda_{inc}x/L$, where $\Lambda_{inc}$ is the increment of period over the distance x.

Figures 6A, 6B:
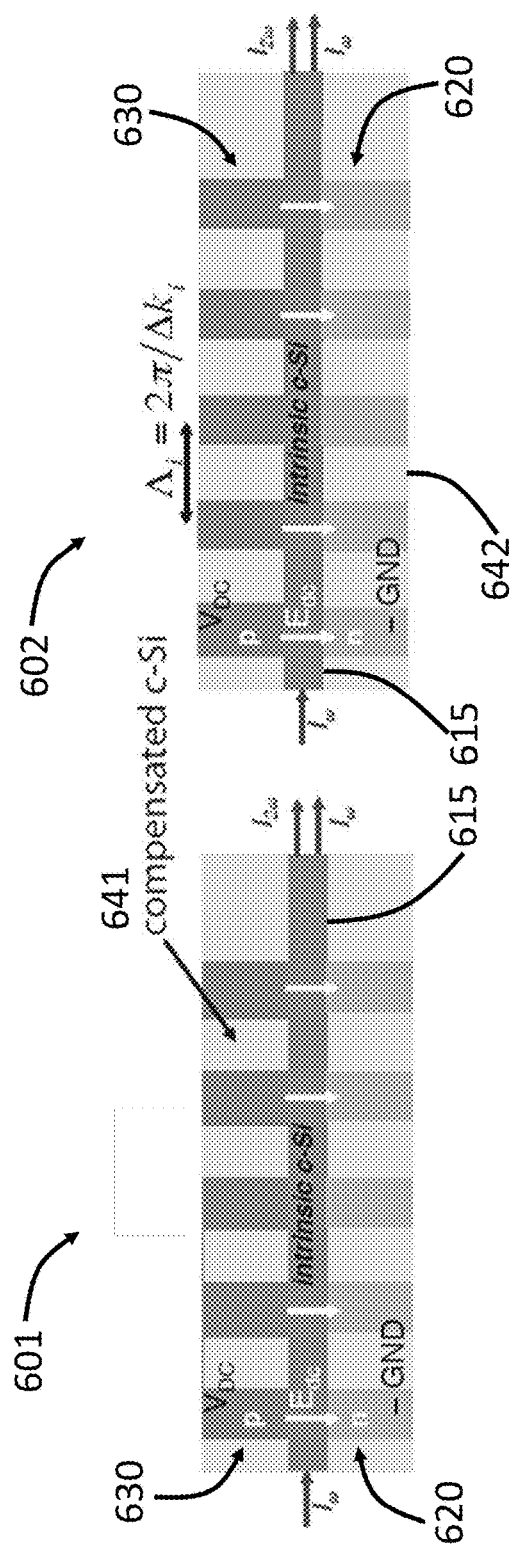
FIGS. 6A-6B show top views of apparatus including compensated crystalline silicon for generating nonlinear optical effects in centrosymmetric materials.

FIGS. 6A-6B show top views of apparatus 601 and 602 including compensated crystalline silicon for generating nonlinear optical effects in centrosymmetric materials. The apparatus 601 includes a waveguide core 615 disposed between an array of n-type regions 620 and an array of p-type regions 630. A compensated silicon region 641 is disposed between adjacent p-type regions 630. The apparatus 602 also includes a waveguide core 615 disposed between an array of n-type regions 620 and an array of p-type regions 630. And a compensated silicon region 642 is disposed between adjacent n-type regions 620. The compensated arrangements can be self-aligned using only a single mask alignment for either p-type or n-type dopants. This can reduce the mask-to-mask alignment errors that typically occur during fabrication. In addition, mask resolution can be increased in this arrangement, reducing the cost of the fabrication of the apparatus 601 and 602.

Figure 7:
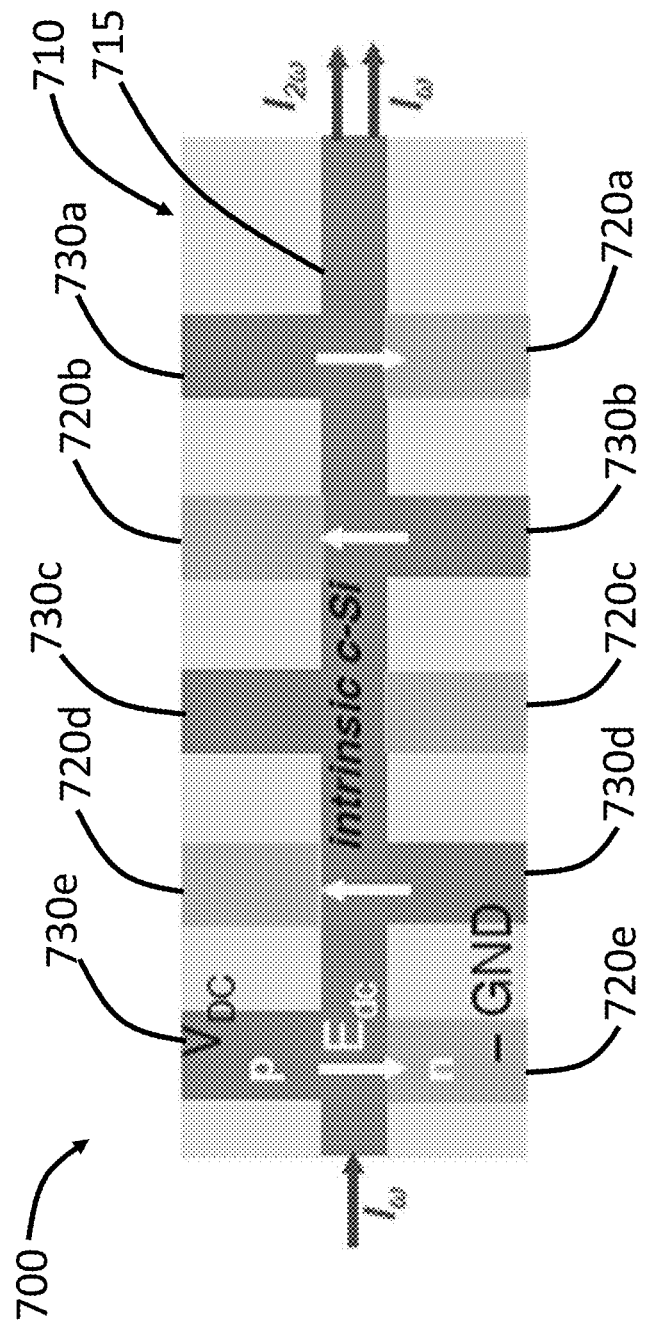
FIG. 7 shows a top view of an apparatus including alternately disposed PIN junctions for generating nonlinear optical effects in centrosymmetric materials.

FIG. 7 shows a top view of an apparatus 700 including alternately disposed PIN junctions for generating nonlinear optical effects in centrosymmetric materials. The apparatus 700 includes a waveguide 710 that further includes a waveguide core 715. Regions disposed on one side of the waveguide core 715 (bottom side) include alternating n-type regions and p-type regions (i.e. n-type region 720a, p-type region 730b, n-type region 720c, p-type region 730d, and n-type region 720e, from right to left). On the other side of the waveguide core 715 (top side), reversely alternating n-type regions and p-type regions are disposed, including p-type region 730a, n-type region 720b, p-type region 730c, n-type region 720d, and p-type region 730e, from right to left.

The alternating configuration of doped regions on each side of the waveguide core 715 can create electrical fields in alternating directions along the length of the waveguide core 715. In other words, electrical fields between adjacent doped regions have opposite directions. For example, the electrical field between 720a and 730a is from top to bottom, while the electrical field between 720b and 730b is from bottom to top as indicated by arrows illustrated in FIG. 7. This configuration can reduce device length DC electric field crosstalk within the undoped regions that may otherwise limit the performance of the apparatus 700 or increase the performance up to 4 times without altering the length of the apparatus 700.

Figure 8:
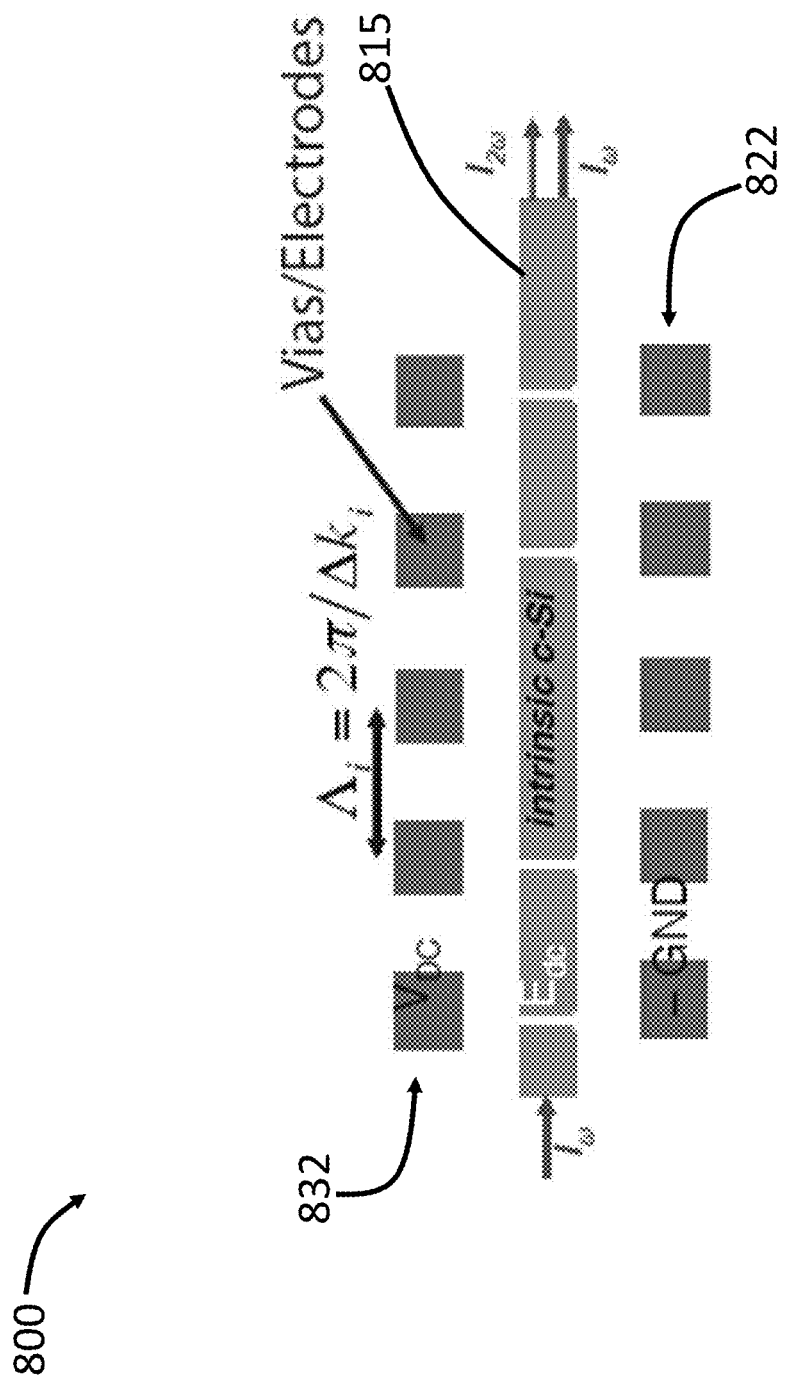
FIG. 8 shows a top view of an apparatus using an array of electrodes to generate nonlinear optical effects.

FIG. 8 shows a top view of an apparatus 800 using an array of electrodes to generate nonlinear optical effects. The apparatus 800 includes a waveguide core 815 disposed between a first array of electrodes 832 on one side and a second array of electrodes 822 on the other side. Compared to the apparatus shown in FIGS. 1A-7, the apparatus 800 removes the waveguide doping masks. The period (or pitch) of the electrodes 822 and 832 can range from about 100 nm to 10 mm. The voltage drop across the electrodes can generate large electric fields in the waveguide core 815. The large electric fields can break the centrosymmetry and generate or increase second order nonlinear susceptibility.

In one example, the electrodes 822 and 832 are arranged in a uniformly periodic pattern (i.e., having one period). In another example, the electrodes 822 and 832 are arranged in a chirped pattern (e.g., the chirped pattern described above with reference to FIG. 5).

Figure 9:
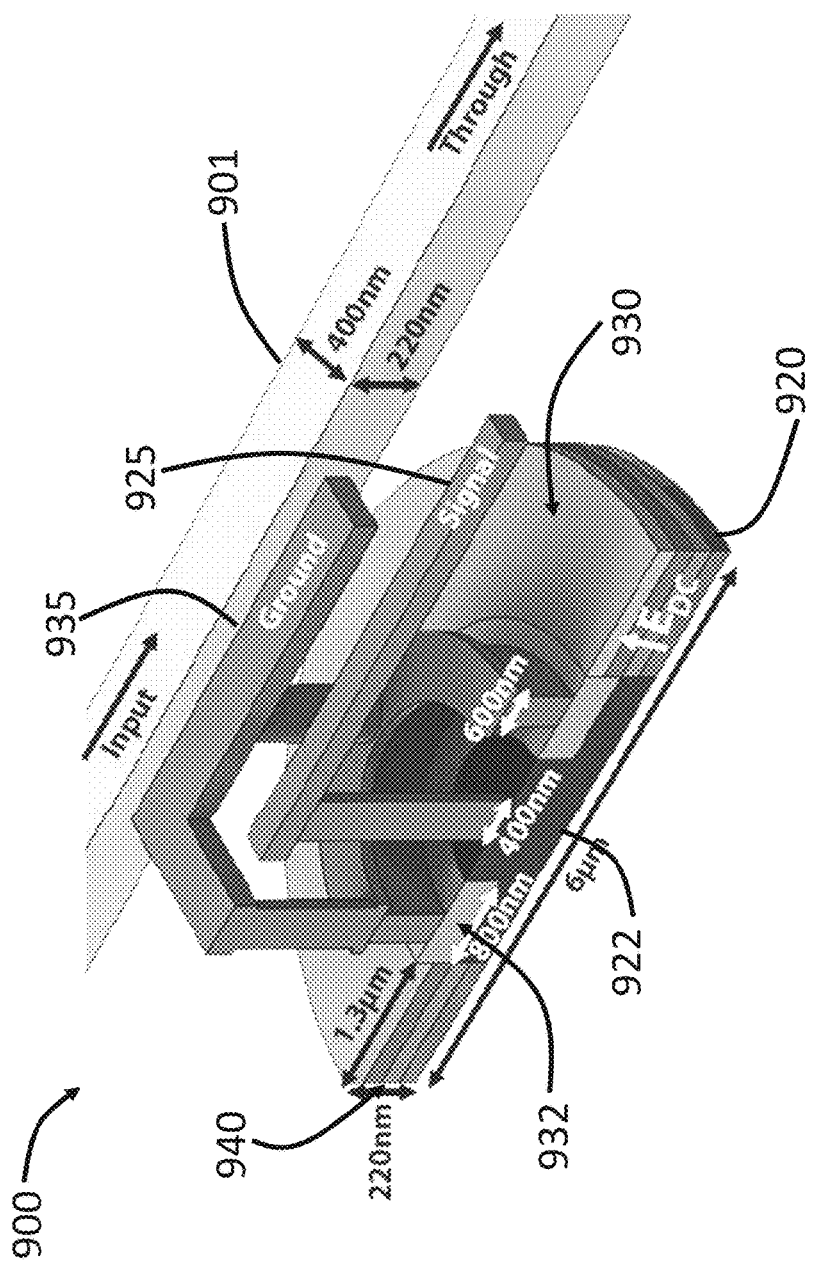
FIG. 9 shows a perspective view of a microdisk resonator including integrated p-n junctions.

FIG. 9 shows a perspective view of a microdisk resonator 900 including integrated p-n junctions for phase shifting. The resonator 900 includes an n-type region 920 and a p-type region 930, which define a depletion region 940 in between. The n-type region 920 is electrically connected to a first electrode 925 via an n+ region 922. The p-type region 930 is electrically connected to a second electrode 935 via a p+ region 932. Applying a voltage between the two electrodes 925 and 935 can thus introduce an electrical field in the depletion region 940. The electrical field, in turn can change the second order susceptibility of the resonator 900 and resonant wavelength of the resonator 900. The amount of change of the resonant wavelength can depend on the applied voltage (also referred to as the bias voltage). The resonator 900 is evanescently coupled to a bus waveguide 901 (e.g., made of silicon). Applying different voltages on the resonator 900 can therefore selectively filter out spectral components that are in resonance with the resonator 900 (see, e.g., FIGS. 15A-15B).

Figure 10A:
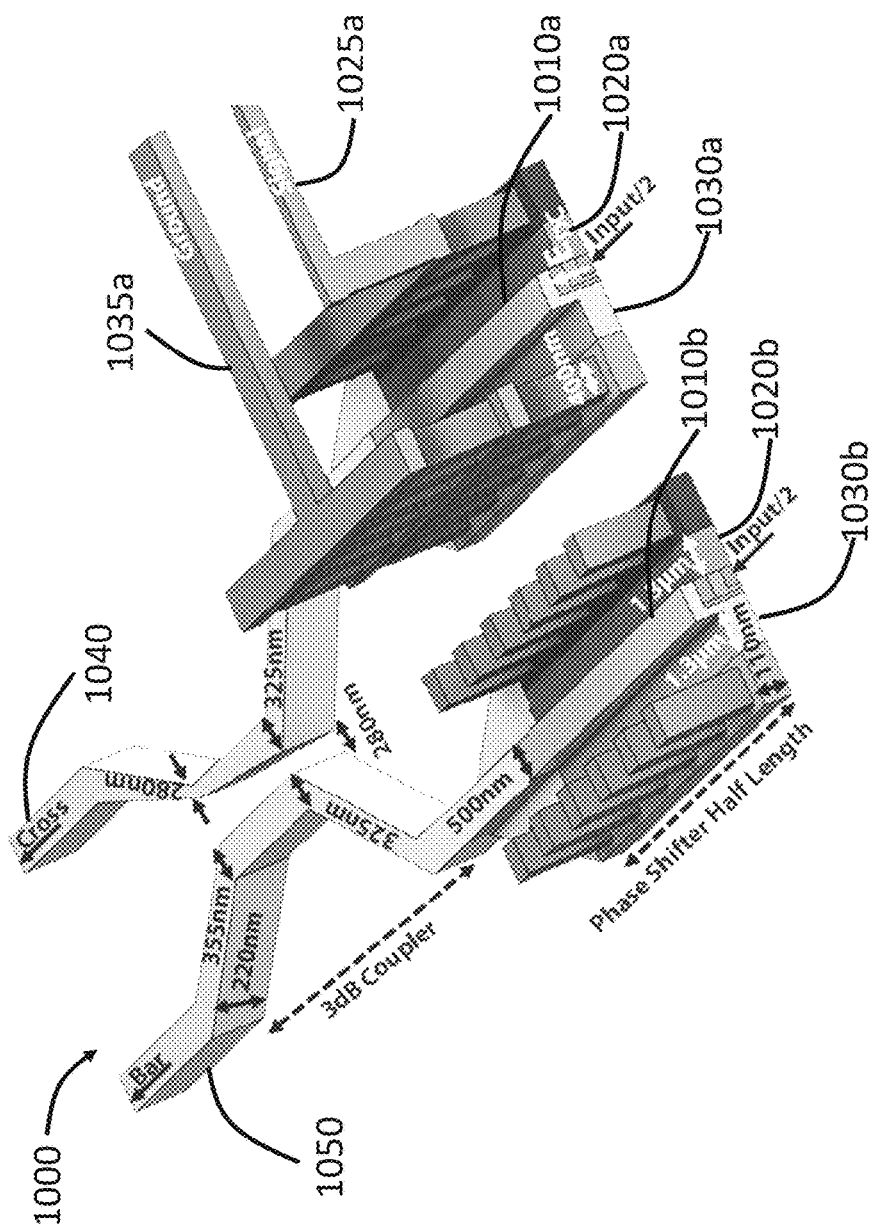
FIGS. 10A-10B show schematics of a Mach-Zehnder interferometer including integrated p-n junctions.
Figure 10B:
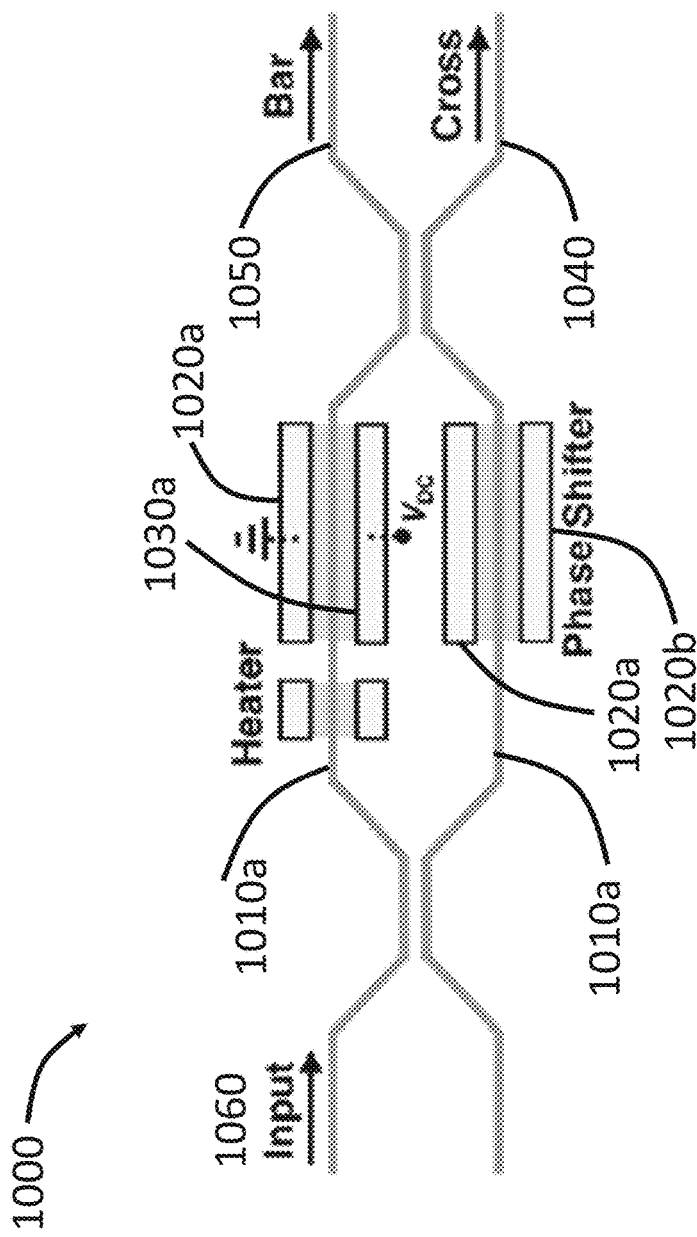

FIGS. 10A-10B show schematics of a Mach-Zehnder interferometer 1000 including integrated p-n junctions. The interferometer 1000 includes an input 1060 (shown in FIG. 10B) to receive incident light beams and a first arm 1010a (i.e. waveguide) disposed between an n-type region 1020a and a p-type region 1030a. The n-type region 1020a is electrically connected to a first electrode 1025a and the p-type region 1030a is electrically connected to a second electrode 1035a. The interferometer 1000 also includes a second arm 1010b disposed between an n-type region 1020b and a p-type region 1030b, but no electrode is connected to the doped regions 1020b and 1030b. The interferometer 1000 also includes a first (cross) output port 1040 and a second (bar) output port 1050. Applying a voltage on the two electrodes 1025a and 1035a can increase the second order susceptibility of the first arm 1010a, thereby imposing additional phase shift to light beams in the first arm 1010a. Accordingly, the output beam intensity at the two output ports 1040 and 1050 can also change.

Methods of Generating and Enhancing Nonlinear Optical Effects

Figure 11:
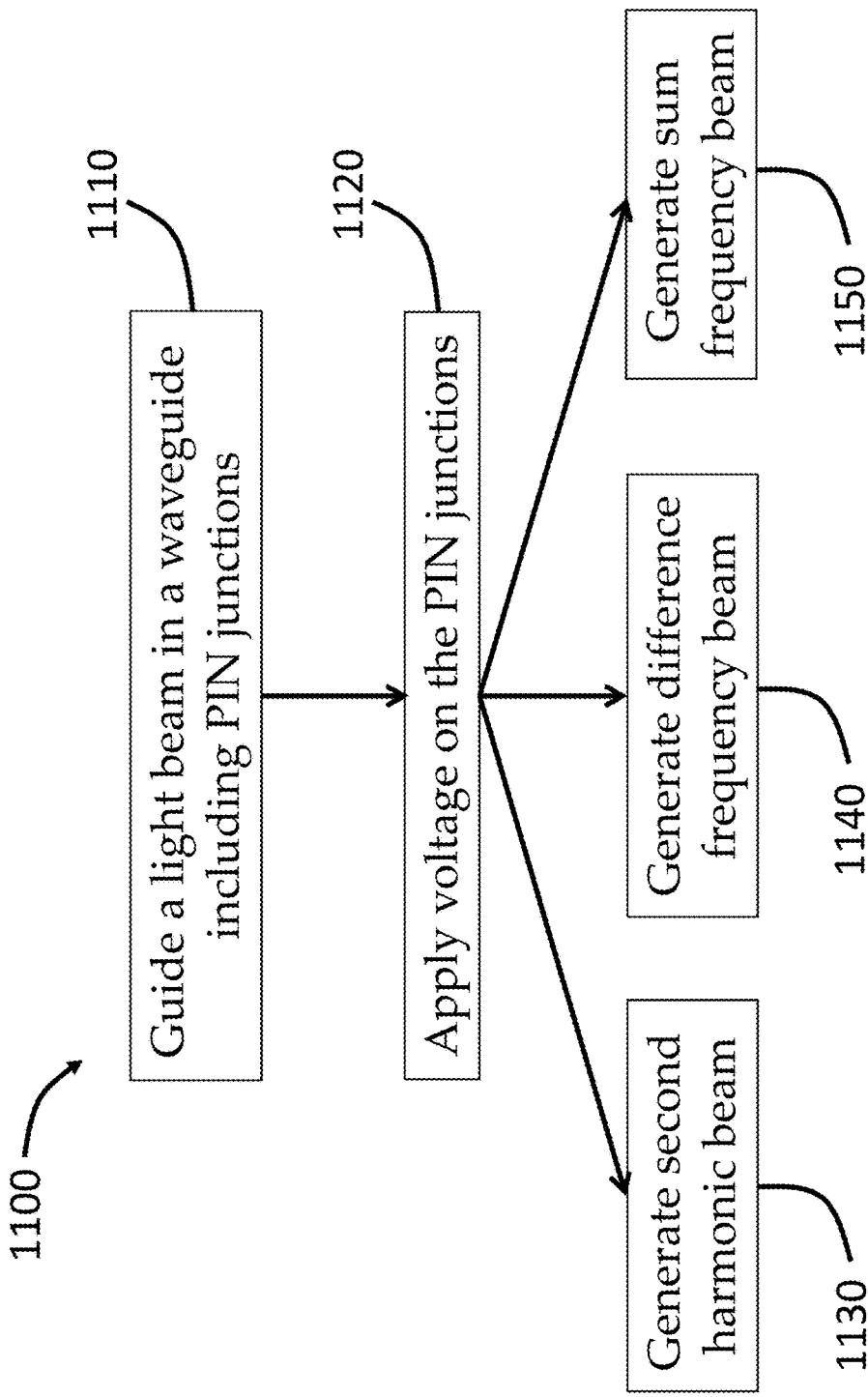
FIG. 11 illustrates a method of generating/enhancing nonlinear optical effects in centrosymmetric materials.

FIG. 11 illustrates a method 1100 of generating and/or enhancing nonlinear optical effects in centrosymmetric materials. The method 1100 includes, at step 1110 guiding a light beam in a waveguide formed of centrosymmetric material. The waveguide includes an array of p-type regions made of a p-type material on one side of a waveguide core and an array of n-type regions made of an n-type material on the other side of the waveguide core. The p-type regions, the n-type regions, and the waveguide core form an array of PIN junctions. The waveguide can be substantially similar to any of the waveguides described above with reference to FIGS. 1A-10. The method 1100 also includes, at step 1120, applying a voltage on the PIN junctions to increase a second order susceptibility of the centrosymmetric material.

With enhanced second order susceptibility, the method 1100 can include several options to utilize the nonlinearity of the waveguide. In general, step 1110 includes guiding a first light beam at a first frequency $\omega_1$ and having a first wave vector $k_{\omega 1}$ in the waveguide. Step 1110 also includes guiding a second light beam at a second frequency $\omega_2$ and having a second wave vector $k_{\omega 2}$ in the waveguide. The period $\Lambda$ is based on the first wave vector $k_{\omega 1}$ of the first light beam and the second wave vector $k_{\omega 2}$ of the second light beam.

In one example, the method 1100 can include second harmonic generation at step 1130. In this example, the second frequency $\omega_2 = 2\omega_1$ and the period $\Lambda$ can be set as $\Lambda = 2\pi/(2k_{\omega 1} - k_{\omega 2})$ to satisfy phase matching conditions for second harmonic generation.

In another example, the method 1100 can include difference frequency generation at step 1140, at which a third light beam is generated from the first light beam and the second light beam. The third beam has a third frequency $\omega_3 = (\omega_1 - \omega_2)$ and a third wave vector $k_{\omega 3}$ in the waveguide. The period $\Lambda$ can be set as $\Lambda = 2\pi/((k_{\omega 1} + k_{\omega 2}) - k_{\omega 3})$ to satisfy phase matching conditions.

In yet another example, the method 1100 can include sum frequency generation at step 1150, at which a third light beam is generated from the first light beam and the second light beam. The third beam has a third frequency $\omega_3=(\omega_1+\omega_2)$ and a third wave vector $k_{\omega 3}$ in the waveguide. The period $\Lambda$ can be set as $\Lambda=2\pi/((k_{\omega 1}+k_{\omega 2})-k_{\omega 3})$ to satisfy phase matching conditions.

Theoretical Analysis of the DC Kerr Effects

Figures 12A, 12B:
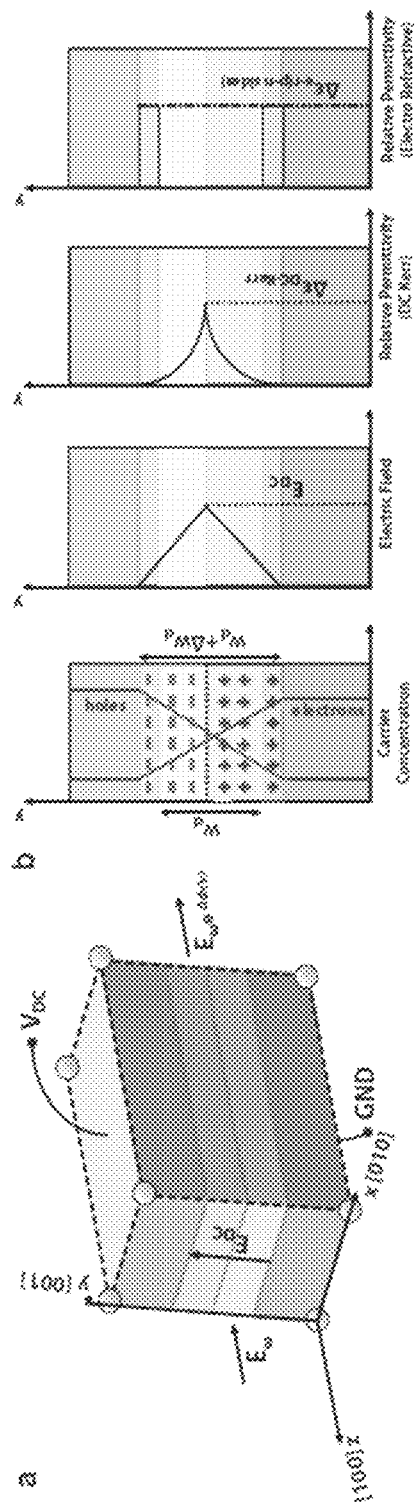
FIG. 12A illustrates a p-n vertical junction silicon waveguide for theoretical analysis of DC Kerr effect.
FIG. 12B shows the depletion width, electric field, and relative permittivities due to DC Kerr effect and electro-refraction with respect to the silicon waveguide height.

FIG. 12A illustrates a p-n vertical junction silicon waveguide for theoretical analysis of the DC Kerr effect. FIG. 12B shows the depletion width, electric field, and relative permittivities due to the DC Kerr effect and electro-refraction with respect to the silicon waveguide height.

As described above, an applied DC electric field across a silicon waveguide can orient electric dipoles and break the crystalline symmetry within silicon. The broken crystalline symmetry can induce second order nonlinearity, which can be used for second harmonic generation and/or altering the electric permittivity.

Without being bound by any particular theory or mode of operation, the electric field induced second harmonic generation (EFISHG) can be a four-wave mixing process involving two fundamental optical fields ($E_\omega$), a DC field ($E_{DC}$), and an output harmonic optical field ($E_{2\omega}$) in the form of $\chi^{(3)}(2\omega;\omega,\omega, 0)$. However, phase-matching between the fundamental and harmonic fields can be a challenge for efficient harmonic generation. In contrast, a field induced permittivity change, also referred as the "electro-optic DC-Kerr effect" or "quadratic field effect", can be conveniently characterized as a phase-matched four-wave mixing process, since two of each DC and optical fields ($E_{DC}$, $E_\omega$) are involved in the form of $\chi^{(3)}(\omega; \omega, 0, 0)$ (see FIG. 12A). In conjunction with the DC Kerr effect, the electro-refractive "plasma dispersion" effect can also take place in a silicon junction and modifies the permittivity with respect to the change in free-carrier concentration. For an applied voltage and the DC field, $E_{DC}$, the nonlinear displacement current of interest can be:

$$D = \varepsilon_0 \left[ \underbrace{\varepsilon_{Si} E_\omega \cos(\omega t)}_{\text{Linear Polarization}} + \underbrace{\Delta\varepsilon_{e-r} E_\omega \cos(\omega t)}_{\text{Electro-refractive Effect}} + \underbrace{3\chi^{(3)}_{ijkl} E^2_{DC} E_\omega \cos(\omega t)}_{\text{Electro-optic DC Kerr Effect}} + \underbrace{\frac{3}{4}\chi^{(3)}_{ijkl} E_{DC} E^2_\omega \cos(2\omega t)}_{\text{Field Induced Second Harmonic (EFISH)}} \right] \quad (1)$$

where $\varepsilon_0$, $\varepsilon_{Si}$ and $\Delta\varepsilon_{e-r}$ are the permittivity of vacuum, the permittivity of silicon, and electro-refractive relative permittivity, respectively.

In Equation (1), the DC Kerr nonlinearity can induce a relative permittivity according to the $\chi^{(3)}_{ijkl}$ tensor and the applied DC field. Crystalline silicon belongs to the m3m point-symmetry group and exhibit two independent tensor components, and $\chi^{(3)}_{xxxx}$. Therefore, the DC Kerr permittivities ($\Delta\varepsilon_x$, $\Delta\varepsilon_y$, $\Delta\varepsilon_z$) can be derived and related to the second order nonlinearities as:

$$\begin{bmatrix} \Delta\varepsilon_x \\ \Delta\varepsilon_y \\ \Delta\varepsilon_z \end{bmatrix} = \quad (2)$$

$$3\underbrace{\begin{bmatrix} \chi^{(3)}_{xxxx} & \chi^{(3)}_{xxyy} & \chi^{(3)}_{xxyy} \\ \chi^{(3)}_{xxyy} & \chi^{(3)}_{xxxx} & \chi^{(3)}_{xxyy} \\ \chi^{(3)}_{xxyy} & \chi^{(3)}_{xxyy} & \chi^{(3)}_{xxxx} \end{bmatrix}}_{\text{DC Kerr}} \begin{bmatrix} E^2_{DCx} \\ E^2_{DCy} \\ E^2_{DCz} \end{bmatrix} = 2\begin{bmatrix} \chi^{(2)}_{xxx} & \chi^{(2)}_{xyx} & \chi^{(2)}_{xzx} \\ \chi^{(2)}_{xxy} & \chi^{(2)}_{yyy} & \chi^{(2)}_{xzy} \\ \chi^{(3)}_{xxz} & \chi^{(3)}_{xyz} & \chi^{(2)}_{zzz} \end{bmatrix} \begin{bmatrix} E_{DCx} \\ E_{DCy} \\ E_{DCz} \end{bmatrix}$$

The diagonal component of this tensor can be $\chi^{(3)}_{xxxx}=6.95\times 10^{-19}$ m$^2$/V$^2$ and the off-diagonal component can be determined to be $\chi^{(3)}_{xxyy}=1.77\times10^{-19}$ m$^2$/V$^2$ at $\chi\sim 1.55$ μm.

In a silicon waveguide with an integrated vertical p-n junction, the electric field can be generated primarily in the y direction ($E_{DC_x}=E_{DC_z}=0$) with the light propagation in z direction. Then, the nonlinear permittivities can be simplified to $\Delta\varepsilon_y=3\chi^{(3)}_{xxxx}E^2_{DC_y}=2\chi^{(2)}_{xxxx}E_{DC_y}$ and $\Delta\varepsilon_x=3\chi^{(3)}_{xxyy}E^2_{DC_y}=2\chi^{(2)}_{xxy}E^2_{DC_y}$. The peak second order nonlinearity can be as large as $\chi^{(2)}_{xxx}=62.6$ pm/V and $\chi^{(2)}_{xxy}=15.9$ pm/V for an applied field that is equal to the silicon breakdown field, $E_{DC_y}=6\times10^7$ V/m.

In this analysis, the transverse-magnetic (TM$_{11}$) polarized field can be aligned with the (1 0 0) crystalline axis, $E_{DC_y}//E^{TM}_\omega$ and induce a strong nonlinear polarization $\Delta\varepsilon^{TM}_{DC\ Kerr}=\Delta\varepsilon_y$. In contrast, the transverse-electric (TE$_{11}$) polarized field can be orthogonal to the DC field, $E_{DC_y} \perp E^{TM}_\omega$ and induce a weaker polarization, $\Delta\varepsilon^{TE}_{DC\ Kerr}=\Delta\varepsilon_x$. In such a junction, a trapezoidal electric field in the vertical can be generated and the peak electric field can be expressed as $E_{DC_y}=qNw_d/(2\varepsilon\ Si)$, where q is the elementary charge, $N=N_A=N_D$ is the acceptor or donor doping concentration and $w_d$ is the depletion width (see FIG. 12B). The depletion width for an abrupt p-n junction can be $w_d=2(\varepsilon_{Si}V_B/qN)^{1/2}$, where $V_B=V+\varphi_B$, is the voltage difference from the built-in potential and $\varphi_B=0.7$ V. Using this relation, the peak electric field simplifies to $E_{DC_y}=(qNV_B/\varepsilon_{Si})^{1/2}$.

The effective permittivity perturbation that acts upon the propagation constant can be estimated by calculating the overlap between nonlinear electric permittivity and optical mode profile over the silicon cross-section ($v_0$):

$$\Delta\varepsilon^{TE,TM}_{DC\ Kerr\ eff} = \frac{\int_{v_0} \Delta\varepsilon^{TE,TM}_{DC\ Kerr} E^{TE,TM*}_\omega E^{TE,TM}_\omega dv}{\int_{v_0} E^{TE,TM*}_\omega E^{TE,TM}_\omega dv} \quad (3)$$

The exact solution can be calculated using the overlap integral discussed in details below. For simplicity, a flattop distribution of the optical mode within the silicon core can be assumed. This assumption simplifies the relative nonlinear permittivity to:

$$\Delta\varepsilon^{TE,TM}_{DC\ Kerr\ eff} = \int_{\phi_B}^{v_B} \frac{\Delta\varepsilon^{TE,TM}_{DC\ Kerr}}{H} \partial w_d = \frac{2\chi^{(3)}_{xxyy,xxxx}}{H}\sqrt{\frac{qN}{\varepsilon_{Si}}}(V_B^{3/2}-\phi_B^{3/2}) \quad (4)$$

where H is the silicon core thickness. The effective second order nonlinearity can be calculated using Equation (2) and the tensor relationship:

$$\chi^{(2)}_{xxy,xxx\ eff} = \frac{\Delta\varepsilon^{TE,TM}_{DC\ Kerr\ eff}}{2E_{DC_y}}. \quad (5)$$

FIG. 13A shows a plot of the effective second order nonlinearity as a function of depletion bias. FIG. 13A shows that the dependence is to the bias voltage and is limited to the breakdown voltage. The breakdown voltages for doping concentrations of n=p=3×10$^{18}$ cm$^{-3}$, 10$^{18}$ cm$^{-3}$ and 5×10$^{17}$ cm$^{-3}$ can be 2.2V, 5V and 8V, respectively. A high breakdown voltage usually indicates a wider depletion region for a given breakdown field, leading to a high effective second order nonlinearity of $\chi^{(2)}_{xxx\,eff}$=35 pm/V and $\chi^{(2)}_{xxx\,eff}$=53 pm/V at 5V and 8V, respectively. Therefore, high doping concentration can result in weak second order nonlinearity due to the low breakdown voltage.

FIGS. 13B and 13C show the relative DC Kerr permittivities for TE and TM polarizations, respectively, as a function of bias voltage. Three different doping concentrations are used in the plots. Although the absolute change in permittivities are relatively low for high doping concentrations, a large change in permittivity-per-voltage (slope) for high doping concentrations is observed.

In contrast to the DC Kerr effect, the electro-refractive effect is related to the change in carrier concentration rather than the electric field itself. This change in carrier concentration occurs usually at the edges of the depletion width ($\Delta w_d$, see FIG. 12B), inducing an index perturbation over a relative small perturbation volume. The relation between the acceptor, donor free-carrier concentrations and the index perturbation ($\Delta n$) can be fitted at $\lambda$=1.55 µm as:

$$\Delta n = A_{A,D} N_{A,D}^{B_{A,D}} + j C_{A,D} N_{A,D}^{D_{A,D}} \quad (6)$$

The curve fitting parameters for donor (D) and acceptor (A) free-carriers can be: $A_D$=−2.37×10$^{-23}$, $B_D$=1.08, $C_D$=4.92×10$^{-26}$, $D_D$=1.2 and, $A_A$=−3.93×10$^{-18}$, $B_A$=0.772, $C_A$=1.96×10$^{-24}$, and $D_A$=1.1. Similar to the DC Kerr effect, the effective permittivity perturbation can be estimated via the calculation of the overlap between electro-refractive permittivity and optical mode profile over the silicon cross-section:

$$\Delta \varepsilon^{TM,TE}_{e-r\,eff} = \frac{\int_{v_0} \Delta \varepsilon^{TM,TE}_{e-r} E^{TM,TE*}_{\omega} E^{TM,TE}_{\omega} dv}{\int_{v_0} E^{TM,TE*}_{\omega} E^{TM,TE}_{\omega} dv} \quad (7)$$

where the electro-refractive permittivity is calculated using the identity, $\Delta \varepsilon = (n+\Delta n)^2 - n^2 \approx 2n\Delta n$. Although the exact solution can be calculated using the overlap integral in the following sections, a flattop distribution of the optical mode within the silicon core can be assumed. In addition, the fitting parameters can be: $C_A$=$C_D$, $B_A$=$B_D$=1, A=$A_A$=$A_D$ and $N_A$=$N_D$=N, for the sake of simplicity. The relative permittivity is then simplified to Eq. (8).

$$\Delta \varepsilon^{TE,TM}_{e-r\,eff} = \quad (8)$$

$$\int_{\phi_B}^{V_B} \frac{2n_{Si}(A+jC)N}{H} \partial w_d = \frac{4\varepsilon_{Si}(A+jC)}{H} \sqrt{\frac{N}{\varepsilon_0 q}} (\sqrt{V_B} - \sqrt{\phi_B})$$

The relative electro-refractive permittivities for TE and TM polarizations and three doping concentrations are plotted until the breakdown voltage in FIGS. 13B and 13C. High doping concentration can result in high electro-refractive effect with a low DC Kerr effect due to breakdown voltage.

Here, a doping concentration of n=p=10$^{18}$ cm$^{-3}$ can provide simultaneously high electro-refractive and DC Kerr permittivities.

Given that the changes in permittivity are known and the sign of both effects are same, the nonlinear and electro-refractive phase shifts in a Mach-Zehnder arm are determined by the following equation:

$$\Delta \varphi^{TE,TM} = \frac{2\pi L}{2 n_{Si} \lambda} \times (\Delta \varepsilon^{TE,TM}_{e-r\,eff} + \Delta \varepsilon^{TE,TM}_{DC\,Kerr\,Eff}) \quad (9)$$

where L is the length of the Mach-Zehnder arm and $n_{Si}$ is the refractive index of silicon. For a cylindrical resonator, the frequency shift of a resonant mode ($\omega_m$) due to the nonlinear index perturbation can be derived from the Poynting's theorem:

$$\Delta \omega^{TE,TM}_m = \frac{\omega_m}{\varepsilon_{Si}} \times (\Delta \varepsilon^{TE,TM}_{e-r\,eff} + \Delta \varepsilon^{TE,TM}_{DC\,Kerr\,Eff}) \quad (10)$$

Note that the nonlinear phase and frequency shifts scale with $V^{3/2}_B$ in a p-n junction. Indeed, the DC Kerr effect based modulators can operate with low voltage swings on top of a large DC bias voltage to achieve large extinction ratios. This can also decrease free carrier losses, device capacitance, and power consumption. The electrical bandwidth can also be increased. In comparison, the electro-refractive phase and frequency shifts scale with $V_B$ in a p-n junction. Therefore, the frequency/phase shifts follow the electro-refractive effect at low bias voltages and follow the DC Kerr effect at large bias voltages in a silicon p-n junction. Although the discussion above is concentrated on the vertical junction case, it can be extended for any arbitrary junction profile using the nonlinear tensor.

Characterizations of Devices Based on DC Kerr Effects

To verify the enhancement of second order susceptibility based on DC Kerr effects, various devices are characterized in this section. Parameters and fabrication methods are described with reference to each figure presenting the characterization results.

Figure 14B:
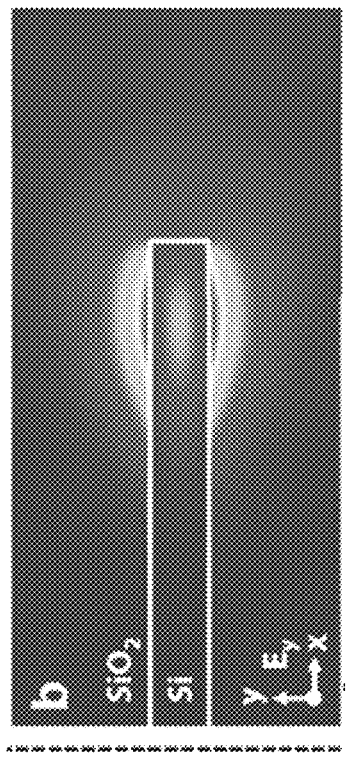
FIGS. 14A and 14B show finite difference eigenmode solutions for TE and TM polarized light, respectively, of a Si microdisk including integrated p-n junction.
Figure 14A:
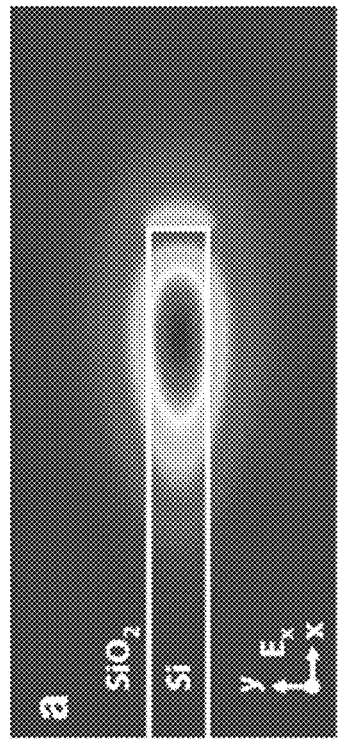
Figures 15A, 15B:
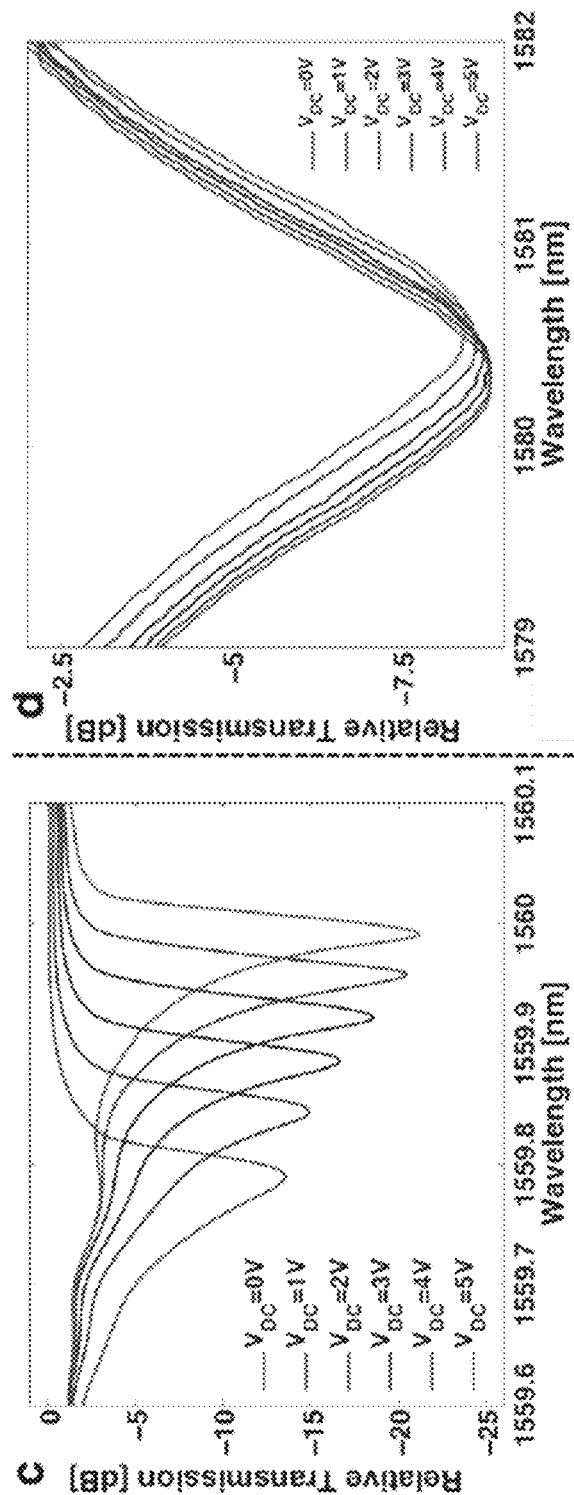
FIGS. 15A and 15B show measured transmission curves as a function of applied voltage and wavelength, respectively, of the Si microdisk.
Figure 16A:
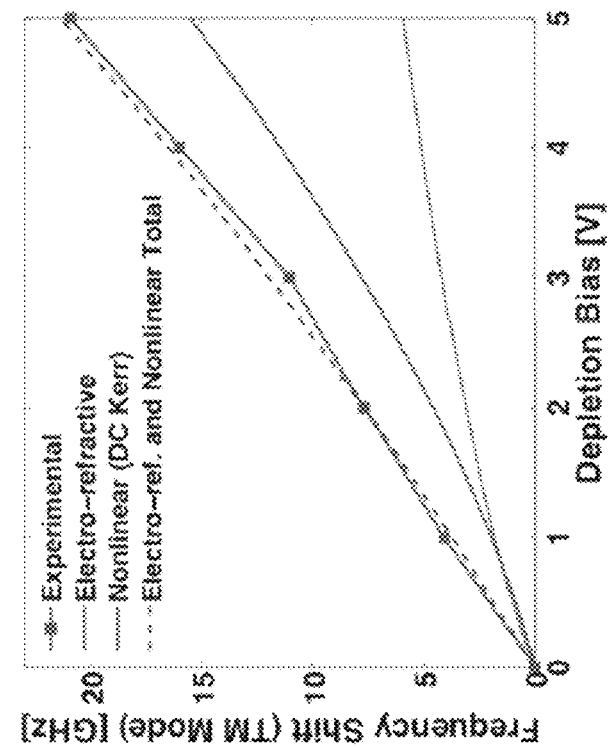
FIGS. 16A-16B show frequency shifts measured from FIGS. 15A and 15B as a function of bias voltage for TE and TM polarized light.
Figure 16B:
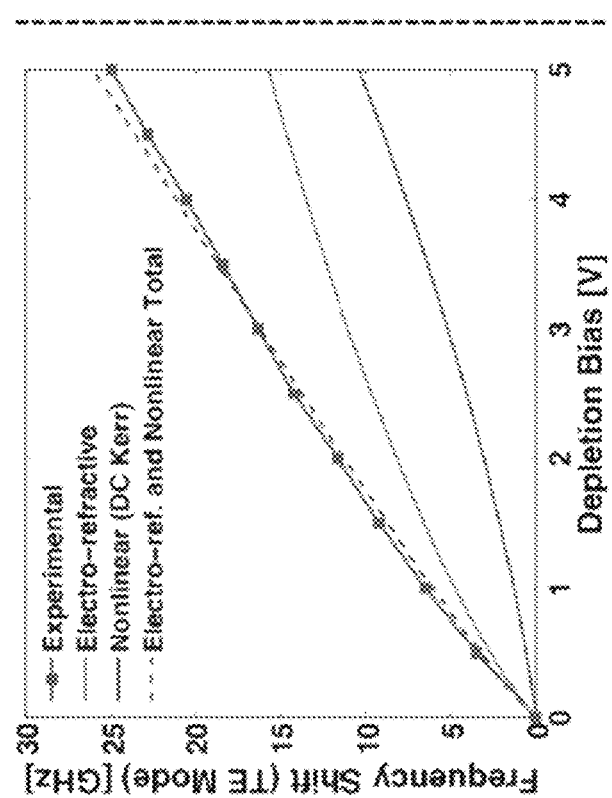

FIGS. 14A and 14B shows finite difference eigenmode solutions of a Si microdisk for TE and TM polarized light, respectively. The Si microdisk is substantially similar to the microdisk 900 illustrated in FIG. 9. FIGS. 15A and 15B show measured transmission curves as a function of applied voltage and wavelength, respectively, of the Si microdisk. FIGS. 16A-16B shows frequency shifts measured from FIGS. 15A and 15B as a function of bias voltage.

Figure 17B:
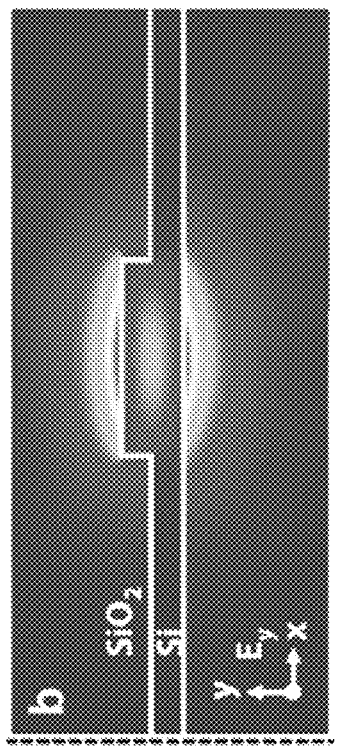
FIGS. 17A and 17B show finite difference eigenmode solutions for TE and TM polarized light, respectively, of a ridge Si waveguide including p-n junctions within a Mach-Zhender Interferometer (MZI).
Figure 17A:
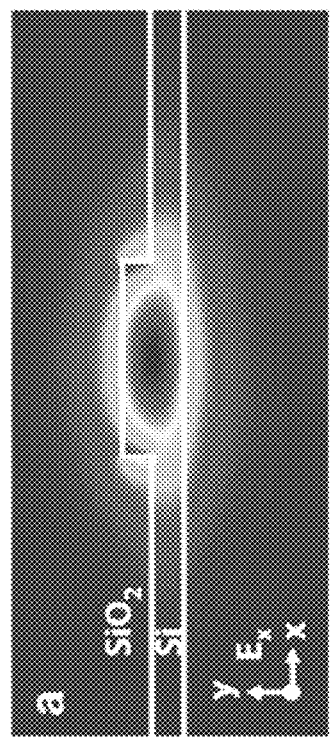
Figures 18A, 18B:
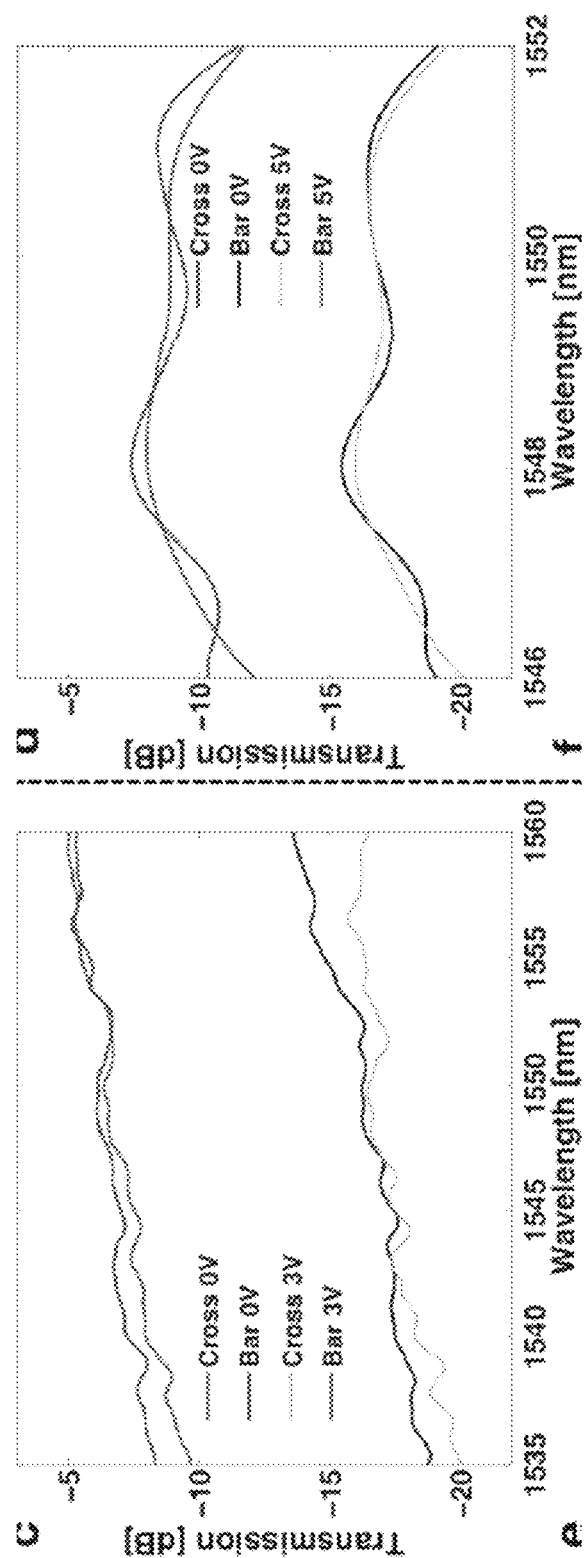
FIGS. 18A and 18B show measured transmission curves as a function of applied voltage and wavelength, respectively.
Figure 19A:
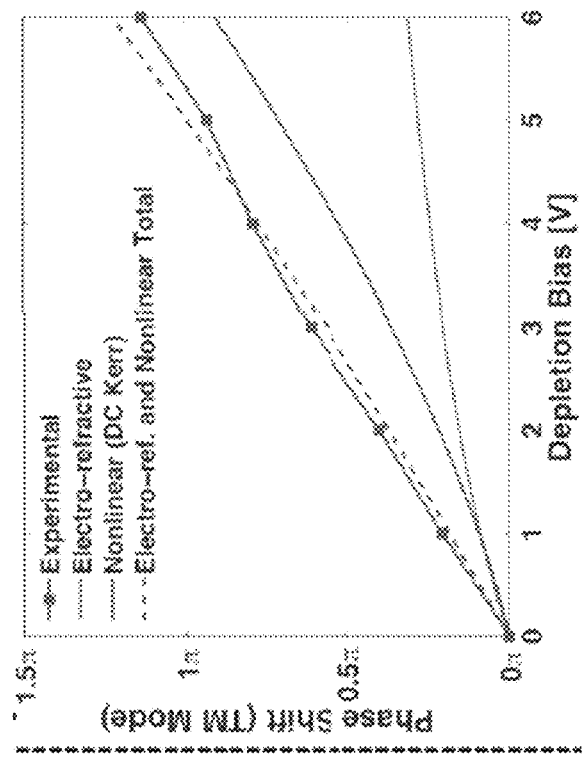
FIGS. 19A and 19B show the frequency shifts measured from FIGS. 18A and 18B as a function of bias voltage for TE and TM polarized light, respectively.
Figure 19B:
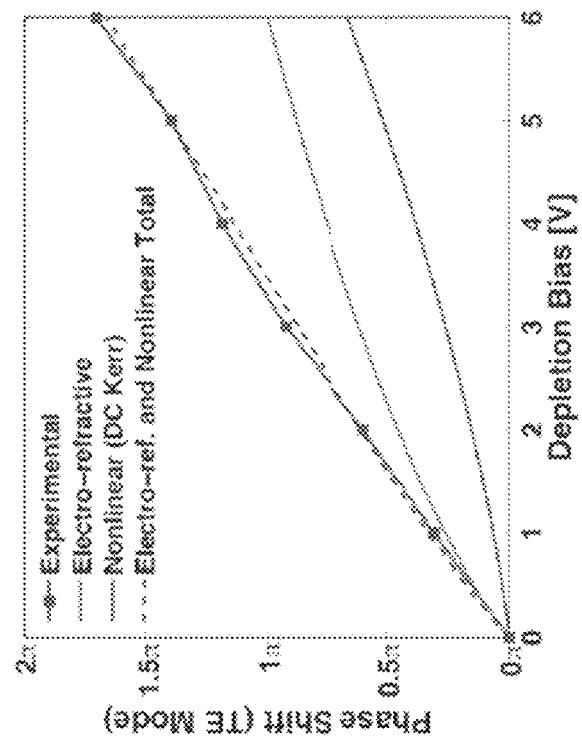

A Mach-Zehnder interferometer (MZI) substantially similar to the interferometer 1000 illustrated in FIGS. 10A-10B is also characterized. FIGS. 17A and 17B show finite difference eigenmode solutions of the ridge Si waveguide within the MZI for TE and TM polarized light, respectively. FIGS. 18A and 18B show measured transmission curves as a function of applied voltage and wavelength, respectively. FIGS. 19A and 19B show the frequency shifts measured from FIGS. 18A and 18B as a function of bias voltage.

The vertical junction microdisk resonator and Mach-Zehnder interferometer (see, e.g., FIGS. 9-10B) can be fabricated in a 300 mm CMOS foundry using silicon-on-insulator (SOI) wafers (e.g., with a 225 nm top silicon layer and a 2 µm buried oxide (BOX) layer) for optical isolation. The top silicon can be etched to form the waveguides and resonators. It can be followed by a partial timed silicon etch to form the ridge waveguides and ridge to straight couplers in Mach-Zehnder interferometers. The etch depth can be, for example, about 110 nm. An oxidization step can be carried out to passivate the sidewalls, thereby reducing the full waveguide thickness (e.g., to about 220 nm) and the ridge thickness (e.g., to about 110 nm).

The vertical abrupt p-n junction, which can be centered at about 110 nm thickness, can be formed from arsenic (As) and boron difluoride ($BF_2$) implants with target concentrations of, for example, about $10^{18}/cm^3$. The n+ and p+ doped regions can be formed by phosphorus and $BF_2$ implants with target concentrations of, for example, greater than $10^{20}/cm^3$. The aluminum electrodes (also referred to as vias) can be connected to highly doped regions by self-aligned silicidation. Two copper routing layers can be used to contact inside the circular contact of the microdisk. These two copper layers are used to contact to on-chip ground-signal-ground (GSG) probing pads (60 μm×60 μm) at a 100 μm pitch.

The spectral response of the vertical junction microdisk resonator can be measured by exciting the fundamental TE-mode and TM-mode of the bus waveguide and the resonator (e.g, suing Agilent 81600B tunable laser source). The on-chip laser power can be calibrated and kept below −20 dBm to eliminate optically induced nonlinearities. The spectral scans at applied DC voltages spanning 0 to 5V (reverse bias) reveal the extinction ratios and frequency shifts for TE and TM polarizations (see FIGS. 15A and 15B). The reverse bias current can be below 0.1 μA in this voltage range, minimizing the thermal frequency shifts (e.g., less than 0.1 GHz).

The frequency shifts for TE and TM excitation can be measured off each resonance dip (see FIGS. 16A and 16B). The nonlinear DC Kerr, electrorefractive, and total frequency shifts can also be calculated for both TE and TM polarizations using Equation (10) and the mode profiles shown in FIGS. 14A and 14B. The calculated curves are overlaid with the experimental results in FIGS. 16A and 16B, demonstrating good agreement.

FIGS. 16A and 16B show that the TE optical mode has an overlap of $\Gamma^{TE}_{e-r} \approx 0.4$ and $\Gamma^{TE}_{DC\ Kerr} \approx 0.78$ and the TM optical mode has an overlap of $\Gamma^{Tm}_{e-r} \approx 0.16$ and $\Gamma^{TM}_{DC\ Kerr} \approx 0.32$. From 0V to 5V DC bias, the frequency shifts from the electro-refractive and the DC Kerr effect are 15.6 GHz and 10.4 GHz (corresponding to $\chi^{(2)}_{xxyeff}=7$ pm/V) for TE polarization, respectively. Over the same voltage range, the shifts from the electro-refractive and the DC Kerr effect are 5.5 GHz and 15.5 GHz (corresponding to $\chi^{(2)}_{xxxeff}=10.7$ pm/V) for TM polarization, respectively.

The spectral response of the 2 mm long vertical junction Mach-Zehnder arm can be measured from the bar and cross outputs of the interferometer. The fundamental TE-mode and TM-mode of the bus and ridge waveguide (see, FIGS. 17A and 17B) can be excited using a tunable laser source (e.g., Agilent 81600B). The on-chip laser power can be kept identical to the microdisk measurements to eliminate optically induced nonlinearities. Both arms of the interferometer can be identically doped and contacted to induce same free-carrier losses on both arms, but only one of these arms is phase shifted.

The spectral scans at applied DC voltages to a Mach-Zehnder arm spanning 0 to 6V (reverse bias) reveals the phase shifts, measured at λ=1550 nm, and Vπ for TE and TM polarizations (see, FIGS. 18A and 18B). The relation with the bar and cross output power ($P_B$, $P_C$) and the phase shift Φ is determined by $\Phi=\cos^{-1}[(P_B-P_C)/(P_B+P_C)]$, and $V_\pi$ is the voltage level that the Bar and Cross output powers are flipped. The reverse bias current can be below 0.1 μA in this voltage range, so the thermal phase shifts can be negligible.

The nonlinear DC Kerr, electrorefractive and total phase shifts are also calculated for both TE and TM polarizations using Equation (9) and the mode profiles shown in FIGS. 17A and 17B. The TE optical mode has an overlap of $\Gamma^{TE}_{e-r} \approx 0.3$ and $\Gamma^{TE}_{DC\ Kerr} \approx 0.54$ with the relative permittivities. The TM optical mode has an overlap of $\Gamma^{Tm}_{e-r} \approx 0.14$ and $\Gamma^{TM}_{DC\ Kerr} \approx 0.28$ with the relative permittivities. The reduced overlap can be due to the lower modal confinement and smaller junction width compared to the microdisk resonator. The higher breakdown voltage (6V) indicates that about 17% of the applied voltage (about 1 V) is dropped across contacts rather than the junction itself. The calculated curves are overlaid with the experimental results in FIGS. 19A and 19B, showing good agreement with the theory.

The TM polarization exhibits relatively low optical bandwidth, limiting the on-chip adiabatic couplers. For 0 V and 6 V, the phase shifts from the electro-refractive and the DC Kerr effect are π and 0.66π (corresponding to $\chi^{(2)}_{xxyeff}=5.0$ pm/V) for TE polarization, respectively. At the same voltage, the phase shifts from the electro-refractive and the DC Kerr effect are 0.32π and 0.9π (corresponding to $\chi^{(2)}_{xxxeff}=10$ pm/V) for TM polarization, respectively.

FIGS. 14A-21B are clearly verifying the birefringent nature of the nonlinear DC Kerr effect. The TM-mode nonlinear frequency and phase shifts are more than two times larger than the electro-refractive effect. Further, the extracted losses from these devices are reduced by 10 dB/cm at 5V reverse bias and 12 dB/cm at 6V reverse bias from unbiased losses of about 30 dB/cm. In addition, the calculations indicate halving of the unbiased capacitance at these bias points, doubling the electrical bandwidth and halving the energy consumption.

FIGS. 14A-21B demonstrate a large DC Kerr effect in integrated silicon devices in a CMOS compatible process at low voltages. The integrated vertical p-n junctions are used to concentrate large electric fields within the microdisk resonator and the Mach-Zehnder interferometer (MZI). The microdisk resonator has a field induced $\chi^{(2)}_{xxxeff}=10.7$ pm/V and a nonlinear electro-optic shift of 15.5 GHz at an applied bias of only 5 V. The MZI has a $\chi^{(2)}_{xxxeff}=10$ pm/V and 0.9π nonlinear phase shift at an applied bias of only 6 V. At these bias points, the traditional electrorefractive responses of both devices are usually less than half of the DC Kerr response, resulting in a paradigm shift for the silicon electro-optic devices. The free carrier losses and the device capacitances are also significantly reduced, thereby allowing low energy and ultra-high-speed manipulation of light in a time scale of a few picoseconds or less. The nonlinear effect can be increased at a low-doped junction with a higher breakdown voltage. In addition, the realized CMOS compatible $\chi^{(2)}$ can be facilitated for efficient second harmonic generation in silicon, which is typically challenging to achieve using conventional methods.

Further characterization of the Mach-Zhender Interferometer is shown in FIGS. 20A-20F and FIGS. 21A-21B.

FIG. 20A shows the measured transmission spectra of the bar and cross ports of an MZI with an intrinsic region, $w_i^1$, and 4.5 mm long phase shifter as a function of DC bias. FIG. 20B shows the measured refractive index perturbations as a function of DC bias for the MZI with an intrinsic region, $w_i^1$. The simulated DC Kerr, plasma-dispersion (P. D.), and total index perturbations are overlaid with the experimental data for comparison. The measurement uncertainty is ±1e-5. FIG. 20C shows the loss change as a function of applied bias when the phase shifter waveguide with an intrinsic region, $w_i^1$, is characterized as a straight waveguide. The measurement uncertainty was ±0.03 dB/cm.

Figures 20D, 20E, 20F:
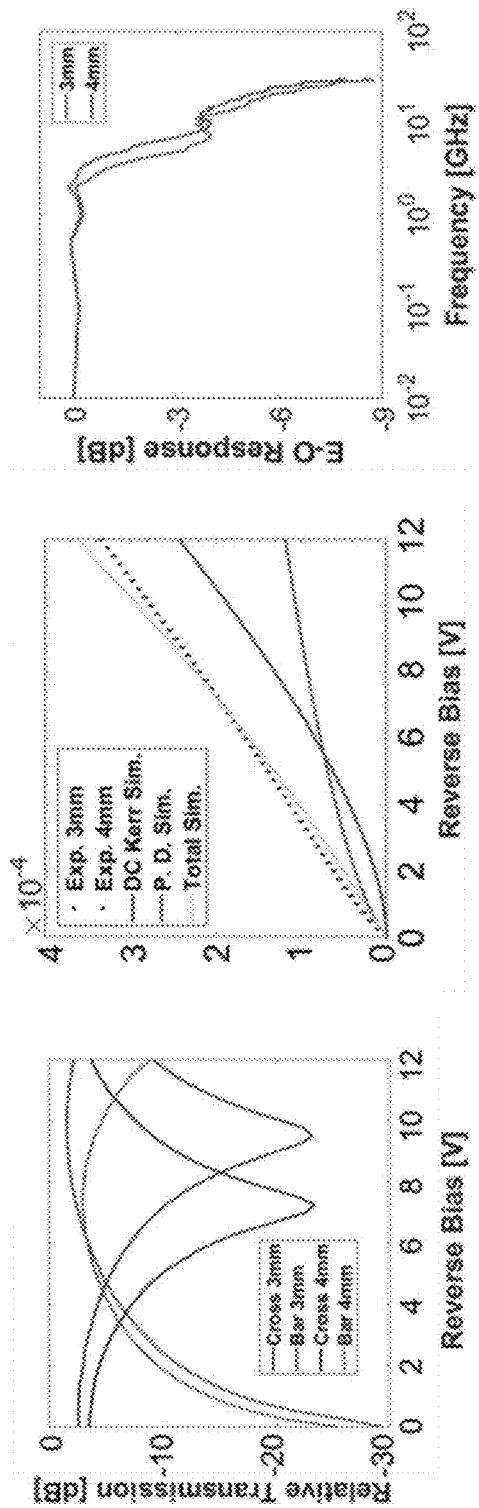
FIG. 20D shows the measured transmission spectra of the bar and cross ports of MZIs with a second intrinsic region width $w_i^2$ and 3-to-4 mm long phase shifters as a function of DC bias.
FIG. 20E shows the measured refractive index perturbations as a function of DC bias for MZIs with the intrinsic region $w_i^2$.
FIG. 20F shows the electro-optic response of the MZIs with the intrinsic region $w_i^2$ as a function of frequency excitation.

FIG. 20D shows the measured transmission spectra of the bar and cross ports of MZIs with an intrinsic region, $w_i^2$, and 3-to-4 mm long phase shifters as a function of DC bias. FIG. 20E shows the measured refractive index perturbations as a function of DC bias for MZIs with an intrinsic region, $w_i^2$. The simulated DC Kerr, plasma-dispersion (P.D.) and total index perturbations are overlaid with the experimental data for comparison. The measurement uncertainty was ±1e-5. FIG. 20F shows the electro-optic response of the MZIs with an intrinsic region, $w_i^2$ as a function of frequency excitation.

Figures 21A, 21B:
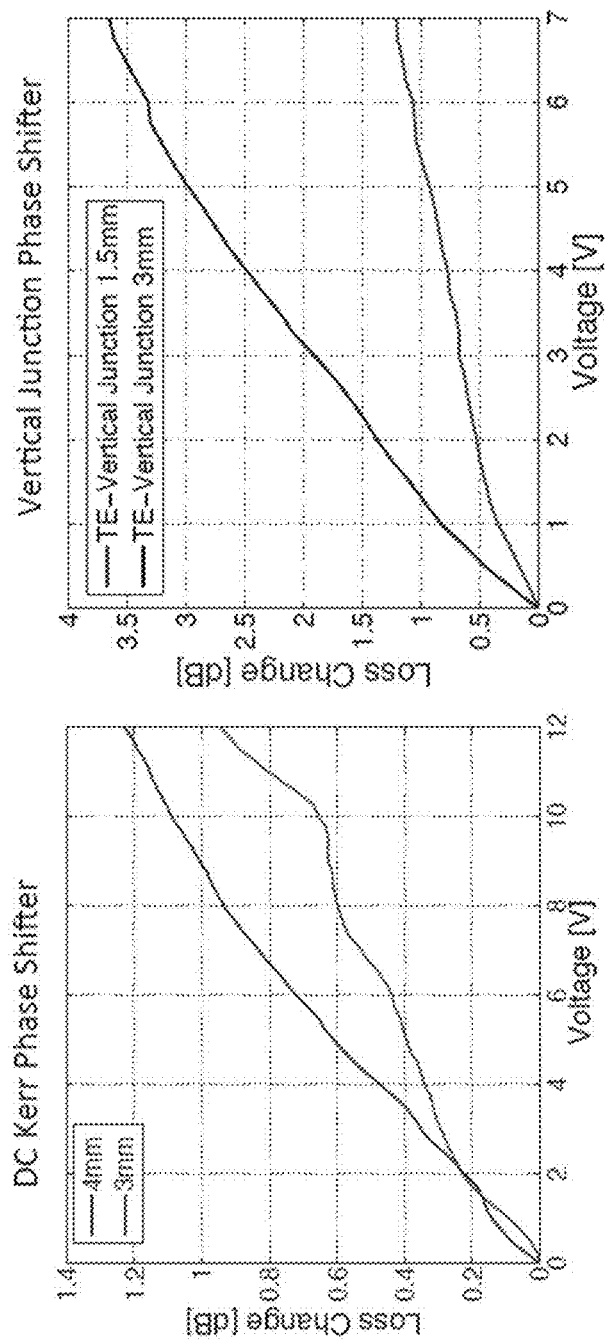
FIG. 21A shows loss changes as a function of applied bias with 3 mm and 4 mm long phase shifters.
FIG. 21B show loss changes as a function of applied bias with 1.5 mm vertical p-n junction and 3 mm vertical p-n junction.

FIG. 21A shows loss changes as a function of applied bias with 3 mm and 4 mm the phase shifters. FIG. 21B show loss changes as a function of applied bias with 1.5 mm vertical p-n junction and 3 mm vertical p-n junction. FIGS. 21A and 21B show that the low loss phase shifters can be used for analog/digital modulation of light and quantum computing.

Two silicon ridge waveguides with embedded p-i-n junctions (see, e.g., FIGS. 10A-10B) are used in these characterizations. The core of the silicon waveguides is 500 nm wide with intrinsic region widths, $w_i^1$ and $w_i^2$. The intrinsic regions are simulated using a process and device simulator, fitting to $w_i^1 = 500 + 2\sqrt{V_{DC}+0.5}$ and $w_i^2 = 200 + 58\sqrt{V_{DC}+0.5}$ in nanometers. Process simulations for silicon ridge waveguides can be performed following the device fabrication steps in Synopsys's Sentaurus Process to form p-i-n diodes within these waveguides. Then, the waveguides can be DC biased in Synopsys's Sentaurus Device. The carrier distributions and depletion widths can be extracted as a function of applied voltage bias.

The large intrinsic regions can facilitate observation of a relatively large DC Kerr effect and reduce the relative electro-refractive permittivity change due to the plasma-dispersion effect. The fundamental TE mode can be selected for maximal confinement and propagation can be chosen to be in the z direction. The optical mode profile $e_\omega^x$ can be simulated using a finite difference mode solver. The x, y, and z directions are aligned with the (0 1 0), (0 0 1), and (1 0 0) crystalline axes of the silicon wafer. The generated electric field is aligned with x direction (i.e., $E_{DC}^y = E_{DC}^z = 0$) for utilizing the diagonal (largest) tensor elements in the third order nonlinear susceptibility of silicon, $\chi_{xxxx}^{(3)} = 2.45 \times 10^{-19}$ m$^2$V$^{-2}$ at $\lambda \sim 1.55$ μm. This is realized with the lateral p-i-n junction.

The DC Kerr index perturbations for both intrinsic regions can be simulated as a function of bias voltage, as shown in FIGS. 20B and 20D. Since the intrinsic silicon width can change slightly with the applied voltage, the plasma-dispersion effect can also be simulated.

The silicon and SiO$_2$ refractive indices for pump and signal wavelengths can be determined using the fit parameters to the Sellmeier's equation. The carrier distribution within the silicon ridge waveguide can be simulated using Synopsys's Sentaurus Process and Device. The carrier distribution can be converted to electro-refractive index distribution using the fit parameters for plasma-dispersion effect. These fit parameters are extracted at $\lambda_{er} \sim 1.55$ μm. The electro-refractive index distributions at pump and signal wavelength can be scaled by $(\lambda_\omega/\lambda_{er})^2$ and $(\lambda_{2\omega}/\lambda_{er})^2$, following the plasma-dispersion relation. The refractive indices and electro-refractive index distributions at pump and signal wavelengths can be combined, respectively. The mode profiles and complex propagation constants for the resulting index distributions can be simulated using a finite-difference mode solver. The loss coefficients at pump and signal wavelengths can be extracted from the imaginary part of the complex propagation constants.

Using Equation (1), the DC Kerr relative permittivity is expressed as:

$$\Delta e_{d.c.\ Kerr} = 12\chi_{xxxx}^{(3)} E_{DC}^{x\ 2} \quad (11)$$

where the electric field is $E_{DC}^x = V_{DC}/w_i$ and $V_{DC}$ is the reverse bias. Assuming a small perturbation to the refractive index, the index perturbation can be approximated with $\Delta n_{DC\ Kerr} = \Delta \varepsilon_{DC\ Kerr}/2\sqrt{\varepsilon_{Si}}$. The overlap integral between the intrinsic region and the optical mode can be used to determine the effective DC Kerr index perturbation, $\Delta n_{eff} = \int_v \Delta n_{d.c.\ Kerr} e_\omega^x e_\omega^{x*} dv$, where the optical mode ($e_\omega^x$) was normalized using $\int_v e_\omega^x e_\omega^{x*} dv = 1$.

The silicon ridge waveguides are placed in MZIs as optical phase shifters for characterizing DC Kerr relative permittivity. MZIs with a 4.5 mm long phase shifter with $w_i^1$ and 3-to-4 mm long phase shifters with $w_i^2$ can be fabricated on a 300 mm silicon-on-insulator (SOI) wafer. The laser power is split into two arms with a broadband silicon 3 dB coupler. The optical path difference between the Mach-Zehnder (MZ) arms can be minimized with a silicon heater in one of the MZ arms and the output of the MZ arms are interfered using the silicon 3 dB coupler. Then, the outputs of the bar and cross ports of the MZIs can be recorded as a function of applied voltages to a single arm of the MZIs (see FIGS. 20A-20D), demonstrating $V_\pi L$ of 6.8 Vcm and 2.8 Vcm for intrinsic regions $w_i^1$ and $w_i^2$, respectively.

The other arm of the MZI can also be doped for reducing loss difference between the MZ arms. The insertion losses due to the fiber couplers can be subtracted. The power difference between the cross and bar ports can be normalized and fitted with $\cos(2\pi \Delta n(v_{DC})L/\lambda)$, where L is the Mach-Zehnder arm length and $\Delta n(v_{DC})$ is the induced refractive index as a function of applied voltage, plotted in FIGS. 20B-20D.

The observed relationship between refractive index change and voltage is substantially quadratic and pseudo-linear for intrinsic region widths $w_i^1$ and $w_i^2$, respectively. In these waveguides, the plasma-dispersion effect is expected to be small due to the large intrinsic regions. Further, the plasma-dispersion effect is expected to follow a dependence close to the square root of the applied voltage due to the voltage dependence of the intrinsic region width. However, this is not observed due to the contribution from the DC Kerr effect. The plasma-dispersion effect in the waveguide with an intrinsic region of $w_i^2$ can contribute to the change in refractive index two times less than the DC Kerr effect for large electric fields, and is negligible in the waveguide with the larger intrinsic region of $w_i^1$.

Furthermore, the loss change over 20 V is measured to be 0.9±0.2 dB-per-cm for a straight waveguide (see FIG. 20E), indicating minimal amplitude chirp. In addition, the MZI bandwidths of $w_i^2$ are measured to ensure that the origin of the phase shift is not related to free carriers and carrier lifetimes. An AC-coupled small signal can be applied through a 500 terminated probe to the MZIs at the quadrature point and the electro-optic response follows an expected RC limited bandwidth (5 GHz and 6.5 GHz for 4 mm and 3 mm phase shifters).

There are multiple potential advantages of DC Kerr effect based silicon MZI modulators compared to plasma-dispersion effect based MZI modulators. First, the plasma-dispersion effect can alter the real and imaginary parts of the refractive index as a function of voltage. This can in turn induce a large loss change as a function of voltage during modulation and introduce amplitude chirp.

Second, since the waveguide core of a plasma-dispersion effect based modulator is doped, there can be insertion loss in the modulator. An injection based modulator bandwidth can be limited by free-carrier lifetime (about 1 ns) and a depletion based modulator bandwidth can be limited by the intrinsic cross-section RC time constant. To increase the electro-optic response in depletion based modulators, a large capacitance p-n junction is usually used, thereby limiting the bandwidth. In contrast, the DC Kerr effect has a low capacitance p-i-n junction. When these limitations are removed, complex modulation formats, coherent communications, RF links and electro-optic analog-to-digital conversion can be realized with the DC Kerr effect based MZI modulators without signal equalization.

Third, the DC Kerr effect is not limited to telecom wavelengths, so phase shifters can be realized at all wavelengths within the silicon transparency window.

Characterizations of Devices with Phase Matching

Devices with the phase matching condition satisfied for nonlinear optical effects can be characterized using waveguides substantially similar to the apparatus 100 illustrated in FIGS. 1A-1C.

Figures 22A, 22B:
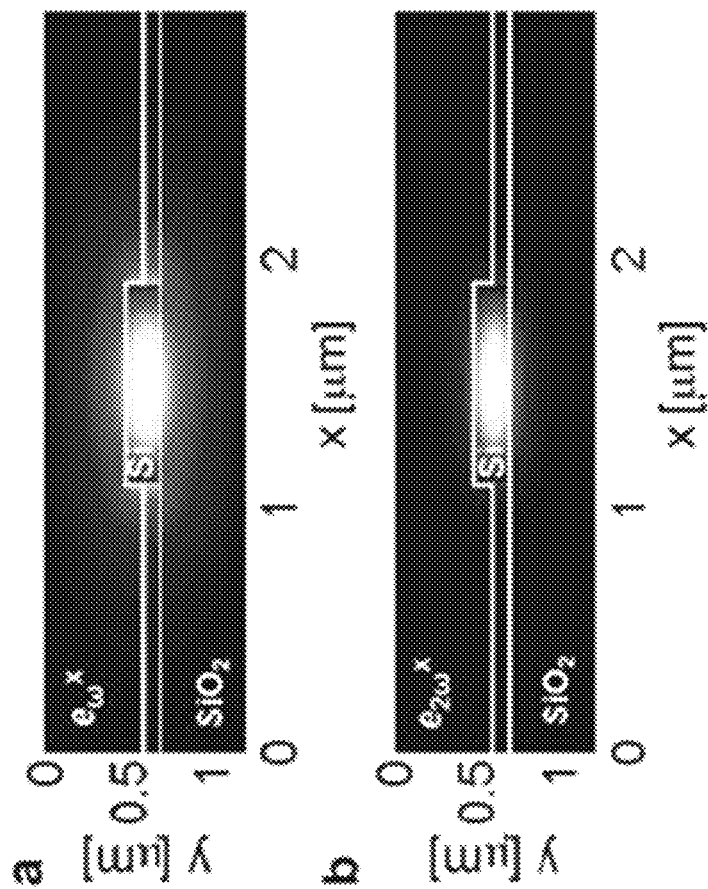
FIGS. 22A and 22B show the modal electric field profiles $(e_\omega^x, e_{2\omega}^x)$ at pump and second harmonic signal wavelengths, respectively, in the silicon waveguide illustrated in FIG. 1A.

FIGS. 22A and 22B show the modal electric field profiles ($e_\omega^x, e_{2\omega}^x$) at pump and second harmonic signal wavelengths in a silicon waveguide illustrated in FIG. 1A. The modal electric field profiles show maximal confinement inside the silicon core and a large overlap. For second harmonic generation, the x polarized pump and signal modes ($e_\omega^x$, $e_{2\omega}^x$) in a silicon ridge waveguide can be fundamental TE modes, which can achieve maximal confinement in the silicon core and a large overlap between the pump and second harmonic signals. In this case, the EFISHG permittivity can be related to the induced second order susceptibility using Equation (1), $\chi_{xxx}^{(2)} = 3\chi_{xxxx}^{(3)} E_{DC}^x$.

Signal and pump wavelengths at $\lambda_{2\omega} \sim 1.145$ μm and $\lambda_\omega \sim 2.29$ μm can be used for characterization. The signal wavelength can be within the transparent silicon region to reduce absorption. The tensor elements can be: $\chi_{xxxx}^{(3)} = (6\pm 3.5)\times 10^{-19}$ m$^2$/V$^2$ at $\lambda_\omega \sim 2.29$ μm. The bulk second order nonlinearity within the silicon waveguide can be as large as $\chi_{xxx}^{(2)} = 3\chi_{xxxx}^{(3)} E_{DC}^x = 72\pm 42$ pm/V for an applied field that is equal to the silicon breakdown field, $E_{DC}^x = 40$V/μm. The effective second order nonlinear susceptibility $\bar{\chi}_{xxx}^{(2)}$ that acts upon the pump and signal modes can be determined using the overlap integral over the intrinsic silicon area, $v_i$, and waveguide area, $v_0$, $\bar{\chi}_{xxx}^{(2)} = 3\chi_{xxxx}^{(3)} \sqrt{v_i} |\int_{v_0} e_{2\omega}^{x*} e_\omega^x e_\omega^{x*} E_{DC}^x dv|$.

The core of the silicon waveguide can be about 800 nm wide for increasing the overlap integral between the fundamental TE pump and signal modes while reducing the electrical voltage for generating large electric fields. The electric field within the silicon core waveguide can be simulated using Synopsys's Sentaurus software suite. When a reverse bias of 21V is applied to the junction, the electric field can be quite uniform inside the silicon core with $E_{DC}^x = 25$V/μm and the effective second order nonlinearity is simulated to be $\bar{\chi}_{xxx}^{(2)} = 26\pm 15$ pm/V.

Although a large second order nonlinearity can be induced in silicon, it can be still beneficial for the pump and signal propagation constants ($k_\omega, k_{2\omega}$) to be phase-matched for efficient second harmonic generation: $2k_\omega - k_{2\omega} = 0$. This is typically not the case for the fundamental TE optical modes due to waveguide and modal dispersion: $k_\omega = 6.132$ μm$^{-1}$, $k_{2\omega} = 16.627$ μm$^{-1}$ at $\lambda_\omega \sim 2.29$ μm and $\lambda_{2\omega} \sim 1.145$ μm.

Therefore, the pump and signal can be coupled when both are in phase and decoupled when both are out of phase. This is referred to as quasi-phase matching. A spatially periodic electric field along the waveguide can be used for quasi-phase matching pump and signal modes in silicon. Lateral junctions are placed with a period of $\Lambda = 1.44$ μm to realize the periodic electric field (see, e.g. FIGS. 1A-1C).

The period $\Lambda$ can be selected to match two times the coherence length for first order quasi-phase matching:

$$2k_\omega^{TE_{11}} - k_{2\omega}^{TE_{11}} + \frac{2\pi}{\Lambda} = 0 \quad (12)$$

The generated second harmonic power $P_{2\omega}$ for a quasi-phase matched nonlinear media can be derived using nonlinear coupled mode theory and the undepleted-pump approximation:

$$P_{2\omega} = \frac{8\bar{\chi}_{xxx}^{(2)2} L_{qpm}^2 P_\omega^2}{\varepsilon_0 n_\omega^2 n_{2\omega} c \lambda_{2\omega}^2 A} \exp[-(2\alpha_\omega + \alpha_{2\omega})L/2] \quad (13)$$

$$\frac{\sin^2(\Delta k L_{qpm}/2) + \sinh^2[(2\alpha_\omega - \alpha_{2\omega})L/4]}{(\Delta k L_{qpm}/2)^2 + [(2\alpha_\omega - \alpha_{2\omega})L/4]^2}$$

where $n_\omega = 2.245$ and $n_{2\omega} = 3.043$ are the effective refractive indices at the pump and signal wavelengths, $\alpha_\omega = 3.6$ cm$^{-1}$ and $\alpha_{2\omega} = 0.2$ cm$^{-1}$ are the simulated optical power loss coefficients at pump and signal wavelengths, $P_\omega$ is the pump power, $A = 0.0915$ μm$^2$ is the modal area, $L = 1$ mm and $L_{qgm} = 0.5$ mm are the nonlinear waveguide and the quasi-phase matched section lengths, $\Delta k = k_{2\omega}^{TE_{11}} - 2k_\omega^{TE_{11}} - 2\pi/\Lambda = 2\pi n_{2\omega}/\lambda_{2\omega} - 4\pi n_\omega/\lambda_\omega - 2\pi/\Lambda$ is the phase mismatch between the pump and second harmonic signal including the quasi-phase matched period.

Figures 23A, 23B:
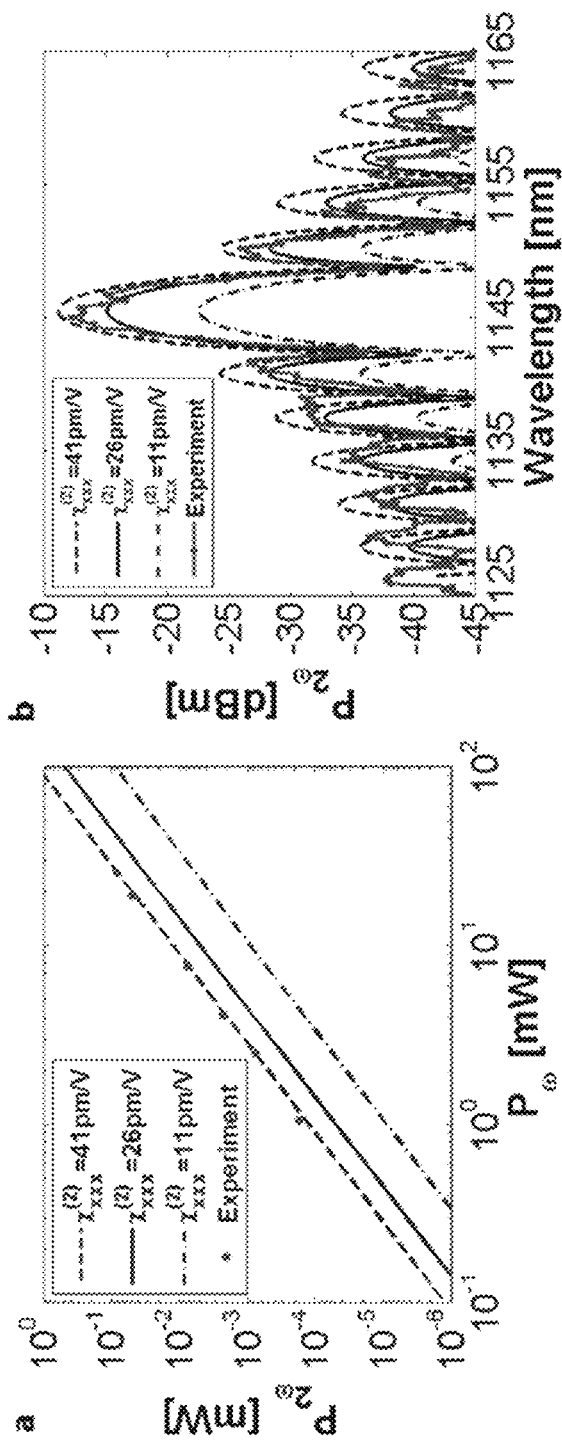
FIG. 23A shows calculated and measured second harmonic power in an integrated second harmonic generator as a function of the power of the pump beam.
FIG. 23B shows calculated and measured second harmonic power in an integrated second harmonic generator as a function of wavelength.
Figures 23C, 23D:
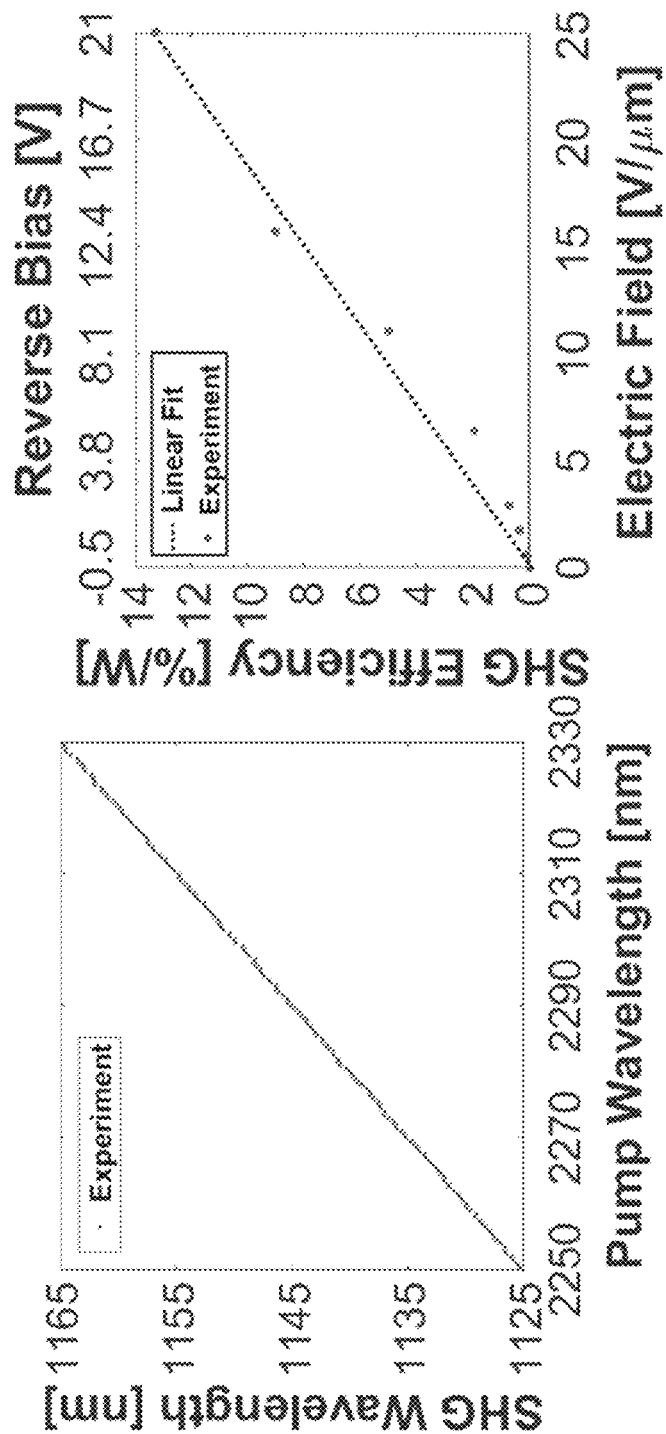
FIG. 23C shows second harmonic wavelength in an integrated second harmonic generator as a function of pump wavelength.
FIG. 23D shows the measured second harmonic generation efficiency $P_{2\omega}/P_\omega^2$ in an integrated second harmonic generator as a function of applied DC bias and electric field.

FIGS. 23A-23E show analytical and experimental results of second harmonic generation using the waveguide described above. FIG. 23A shows analytically calculated and measured second harmonic power as a function of the power of the pump beam. FIG. 23B shows analytically calculated and measured second harmonic power as a function of wavelength. FIG. 23C shows second harmonic wavelength as a function of pump wavelength. The measurement data is overlaid for comparison, showing an effective second order nonlinearity of $\chi_{xxx}^{(2)} 41$ pm/V. The p-i-n junction is reverse biased at 21V, ($E_{DC}^x \sim 25$V μm$^{-1}$). The CW pump power is $P_\omega = 25$ mW in FIG. 23B.

Figure 23E:
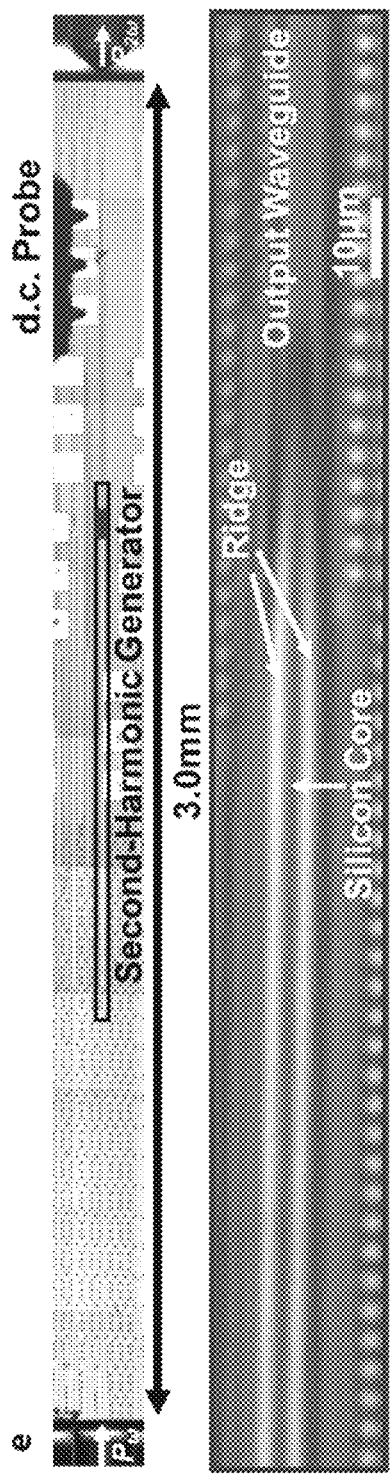
FIG. 23E shows a microscope image of the integrated second harmonic generator as used in obtaining the results presented in FIGS. 23A-23D.

FIG. 23D shows the measured second harmonic generation efficiency $P_{2\omega}/P_\omega^2$ as a function of applied DC bias and electric field. The measurement uncertainty is about ±0.4%/W. FIG. 23E shows a microscope images of the integrated second harmonic generator with the single mode fibers (left: SMF-2000, right: SMF-28), the DC ground-signal-ground probe in the top image, and silicon core and ridge sections in the zoomed in image below. The close-up section is highlighted in the top image with a red rectangle.

The pump power dependence of the SHG can be calculated using Equation (13), as shown in FIG. 23A. The SHG efficiency is estimated to be within $0.9\%/W \leq P_{2\omega}/P_\omega^2 \leq 12\%/W$. The spectral response of SHG at $P_\omega = 25$ mW is also calculated using Equation (13), shown in FIG. 23B. The spectral bandwidth of the main lobe is about 6.5 nm. This efficiency can be achieved if the duty cycle is fixed within each period.

As understood in the art, lithography can lead to variations in duty cycle. The expected conversion efficiency as a function of duty cycle error, $\langle\eta\rangle$, normalized to the ideal $\eta_o$, can be derived to be $\langle\eta\rangle/\eta_0 \cong e^{-(\sqrt{2}\pi\sigma/\pi)^2}$, where σ is the root mean square (RMS) error in the duty cycle. An RMS duty cycle error of σ/Λ=1/5.4 can halve the conversion efficiency but the expected mask alignment error is σ/λ<1/20 in the silicon photonics platform, which corresponds to less than 5% reduction in conversion efficiency.

Furthermore, when the waveguide width and the spatial period are altered in different waveguides, the quasi-phase matched pump wavelength can be designed to be within $\lambda_\omega=2\lambda_{2\omega}=2.15$ μm and $\lambda_\omega=2\lambda_{2\omega}=2.42$ μm. The pump depletion can be calculated to be effective beyond 1 W pump power inside silicon and can be negligible in this power range ($P_\omega$<100 mW).

Figures 24A, 24B, 24C:
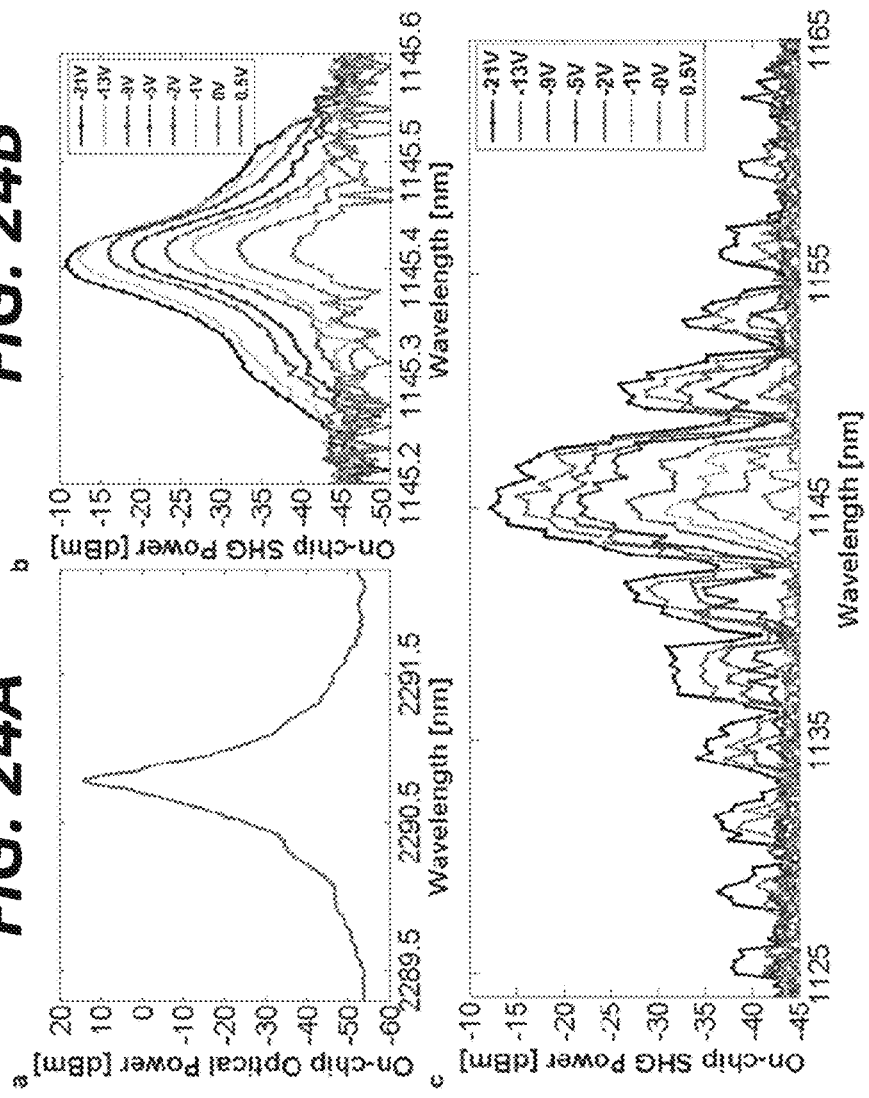
FIGS. 24A and 24B show the on-chip CW optical pump power and second harmonic power, respectively, as a function of wavelength.
FIG. 24C shows the spectral dependence of the second harmonic generation (SHG) power as a function of wavelength and applied voltage bias using a spectrum analyzer.

FIGS. 24A and 24B show the on-chip CW optical pump power and second harmonic power, respectively, as a function of wavelength using a spectrum analyzer. Different bias voltage are also used in FIG. 24B. The measurement uncertainty is about ±0.5 dB. The CW pump power is about $P_\omega$=25 mW. The SHG power increases at a larger reverse bias voltage, following EFISHG theory.

Figure 24D:
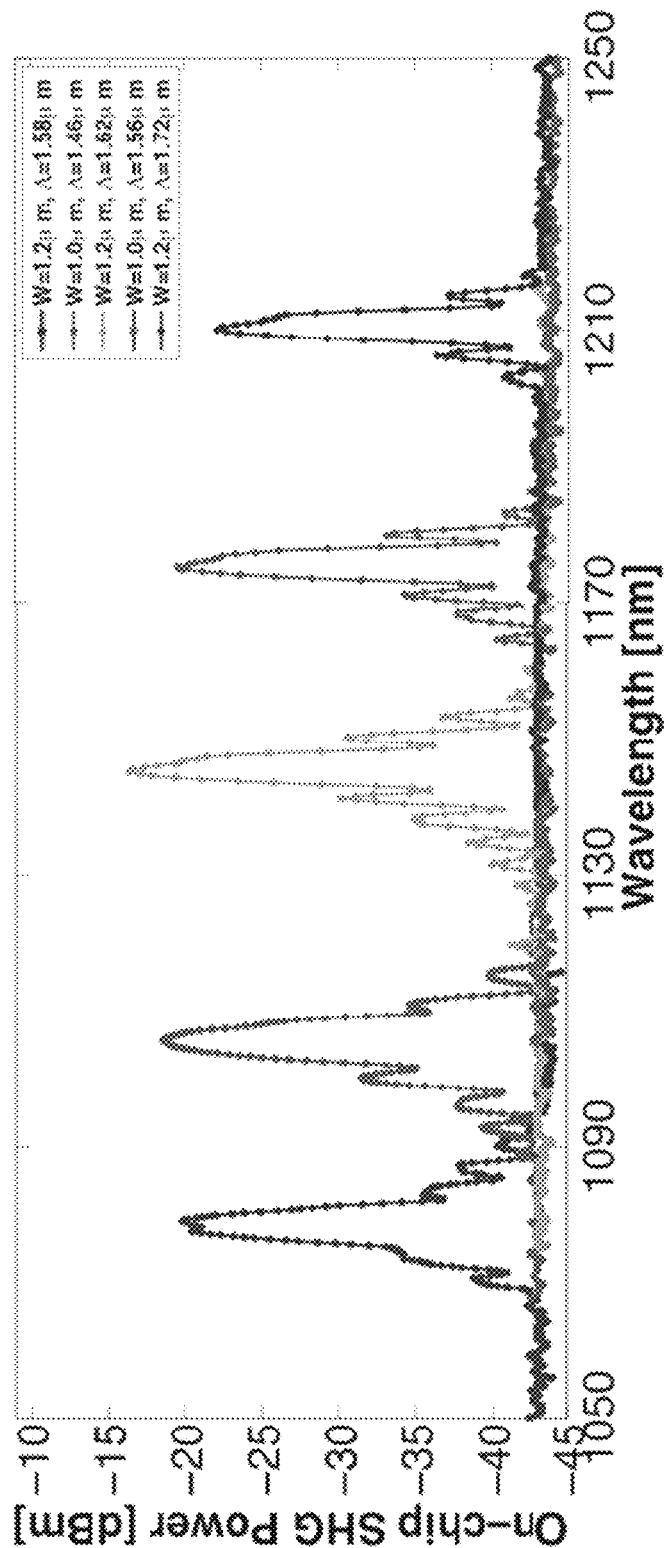
FIG. 24D shows the SHG signals of multiple waveguides with different quasi-phase matching periods for different wavelengths.

FIG. 24C shows the spectral dependence of the SHG power as a function of wavelength and applied voltage bias using a spectrum analyzer. The measurement uncertainty was about ±0.9 dB. FIG. 24D shows the SHG of multiple waveguides with different quasi-phase matching periods for different wavelengths. The CW pump power is $P_\omega$=19 mW and $E_{DC}^x$~25 V μm⁻¹ at all wavelengths. The measurement uncertainty was about ±0.9 dB.

For the DC Kerr modulators, a continuous-wave (CW) laser at X-1580 nm was coupled through a single mode fiber (SMF-28) to an inverse silicon taper. The linearly polarized output of the SMF-28 and the fundamental TE mode of the on-chip waveguide can be aligned using a fiber polarization controller. Another SMF-28 fiber can be used to collect the output light.

For the EFISHG devices, a near-infrared CW tunable pump laser was free-space coupled to one end of a single mode fiber (SMF-2000) and the other end of the fiber was cleaved. The cleaved fiber end was used to couple pump laser to an on-chip inverse silicon taper. A polarization controller was used to align the linearly polarized output of the SW-2000 and the fundamental TE mode of the on-chip waveguide. The on-chip pump and harmonic powers were calibrated by measuring fiber-to-chip coupling losses (12 dB and 6 dB for pump and signal wavelengths) and waveguide losses ($\alpha_\omega$=3.3 cm⁻¹ and $\alpha_{2\omega}$=0.3 cm⁻¹) using waveguides with varying lengths. The waveguide losses were in agreement with the simulated numbers. The maximum on-chip pump power around $\lambda_\omega$~2.29 μm was about $P_\omega$=25 mW (see FIG. 24A), limited by the coupling losses and pump laser. The second harmonic signal can be collected using a lensed single mode fiber (SW-28), and the wavelengths of both pump and second harmonic signals were measured using external optical spectrum analyzers (OSA).

The second harmonic generators can be fabricated on a 300 mm SOI wafer (see, e.g., FIG. 23E). The lateral p-i-n junctions within the waveguide were DC biased spanning from 0.5V to −21V. When the devices are biased further than −21V, the response may not be stable due to leakage current. SHG is not observed when the diode is forward biased ($V_{DC}$>0.5V) or when the spatial period does not provide the proper quasi-phase matching for the pump and signal wavelengths. These indicate negligible background SHG from other contributions. The second harmonic signal can be recorded as a function of the applied DC bias, shown in FIG. 24B.

Linear scaling of SHG efficiency as a function of electric field is recorded (see FIG. 23D). The maximum SHG efficiency is measured to be $P_{2\omega}/P\omega^2$=13±0.5%/W at a pump wavelength of $\lambda_\omega$~2.29 μm and $V_{DC}$=−21V. The reverse bias current passing through the p-i-n junction can be below 0.1 μA at $V_{DC}$=−21V and electric fields can be below the breakdown field. When the measurement results are overlaid with the simulation results in FIG. 23A, the effective field-induced second order nonlinear susceptibility $\bar{\chi}^{(2)}$ can be estimated to be 41±1.5 pm/V.

The SHG power was also measured with external OSAs as a function of reverse bias voltage and signal and pump wavelengths, which are shown in FIG. 24C. The expected sinc²-like response and doubling of pump frequency at the second harmonic frequency are observed in FIG. 23C. However, the spectral sidebands of the sinc²-like response increased slightly faster than the main peak as the DC field is increased, providing additional insight into the ultimate limitations of field-induced second-order nonlinear wave mixing efficiency in a CMOS-compatible platform.

The spectral response at $V_{DC}$=−21V is overlaid with the simulations in FIG. 23B for comparison to the theory. Furthermore, when waveguides with different widths and spatial periods were used, SHGs were observed at multiple wavelengths spanning from $\lambda_\omega=2\lambda_{2\omega}$=2.16 μm to $\lambda_\omega=2\lambda_{2\omega}$=2.42 μm, agreeing well with the simulated quasi-phase matched pump wavelengths (see FIG. 24D). There are many applications of these second harmonic generators such as extracting and locking the carrier envelope frequency offset of an octave spanning supercontinuum signal that spans from about 1.08 um to about 2.42 um.

Figures 25A, 25B:
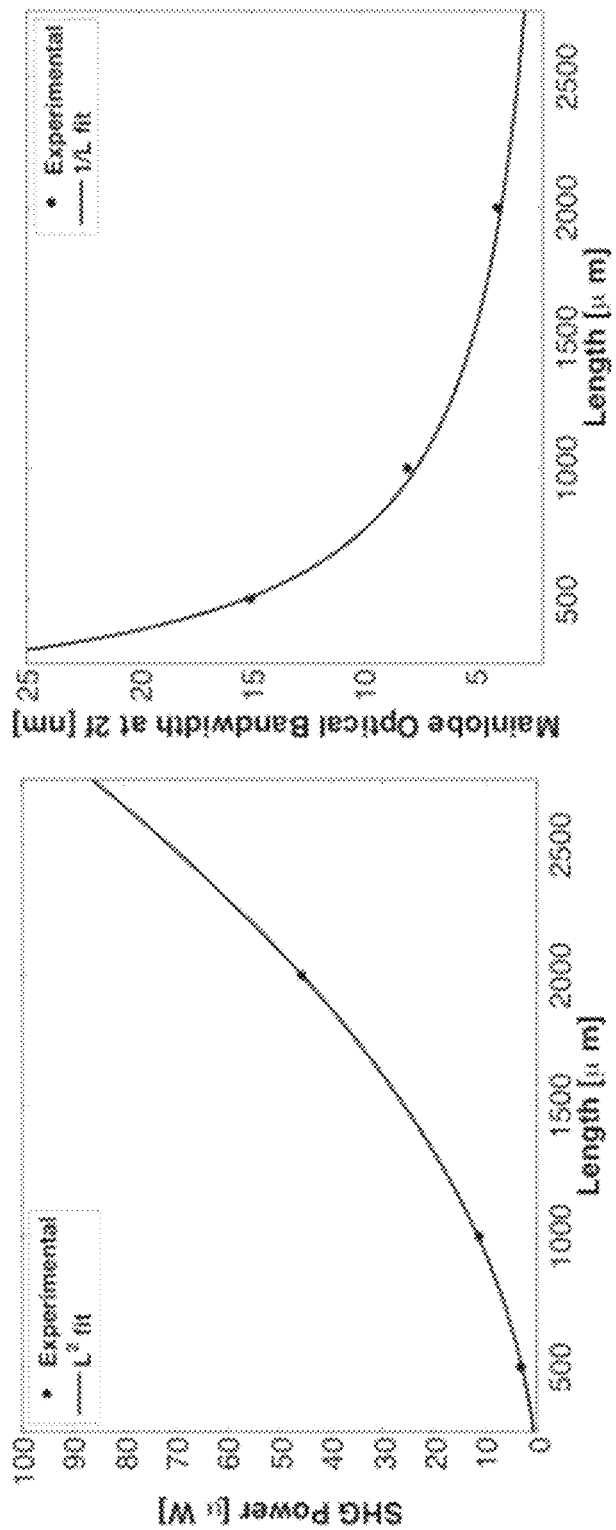
FIGS. 25A and 25B show the SHG power and main lobe bandwidth, respectively, as a function of the length of the SHG generator.
Figure 26:
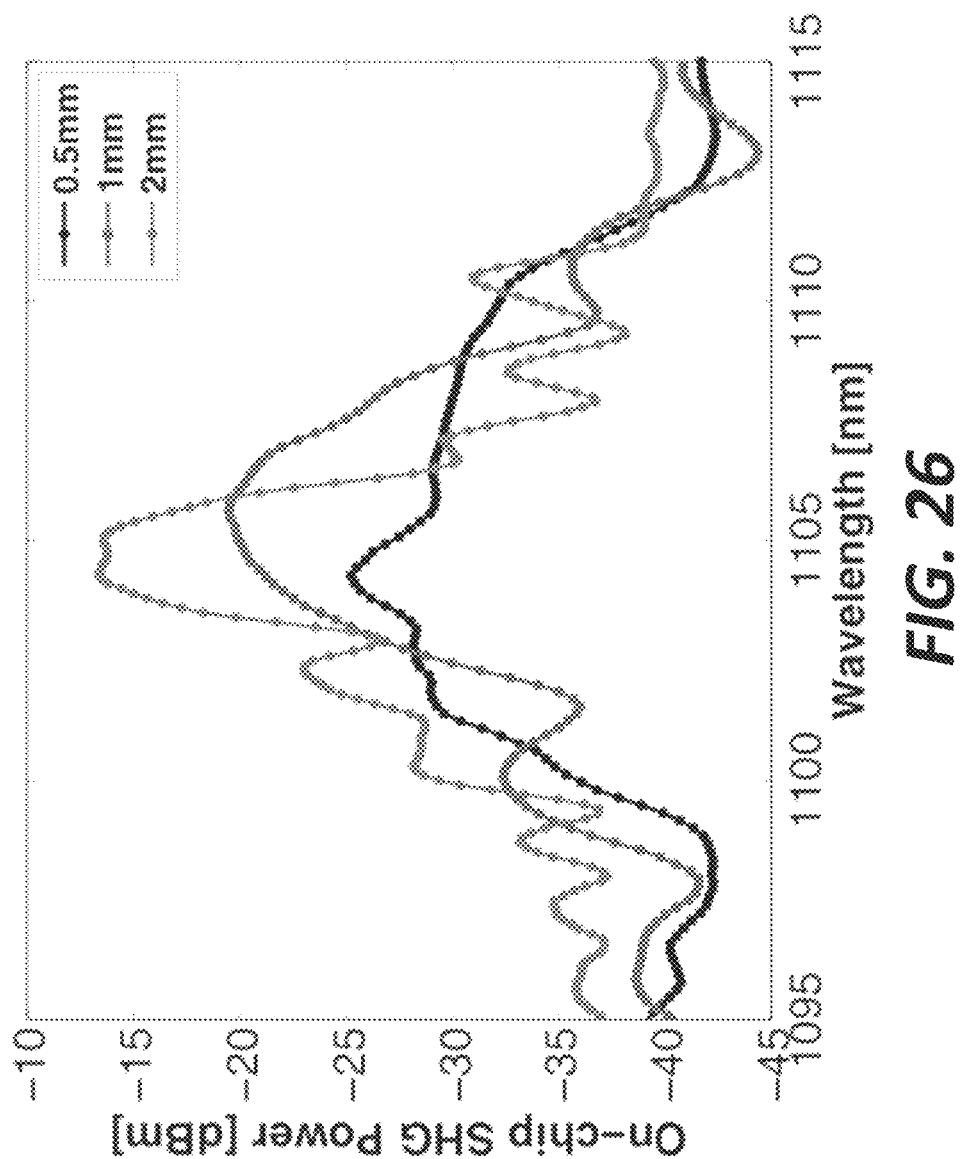
FIG. 26 shows spectra of SHG beams at different generator lengths.

FIGS. 25A and 25B show the SHG power and main lobe bandwidth, respectively, as a function of the length of the SHG generator. The SHG power growth substantially follows an exponential curve, as confirmed by least square ($L_2$) fitting. FIG. 26 shows spectra of SHG beams at different generator lengths. The spectra visually show the decrease of the main lobe linewidth as the length of the generator increases. The main lobe bandwidth, in contrast, decreases exponentially with the length of the SHG generator. These results indicate that the pump beam and the SHG beam are phase matched within the generator.

Figure 27:
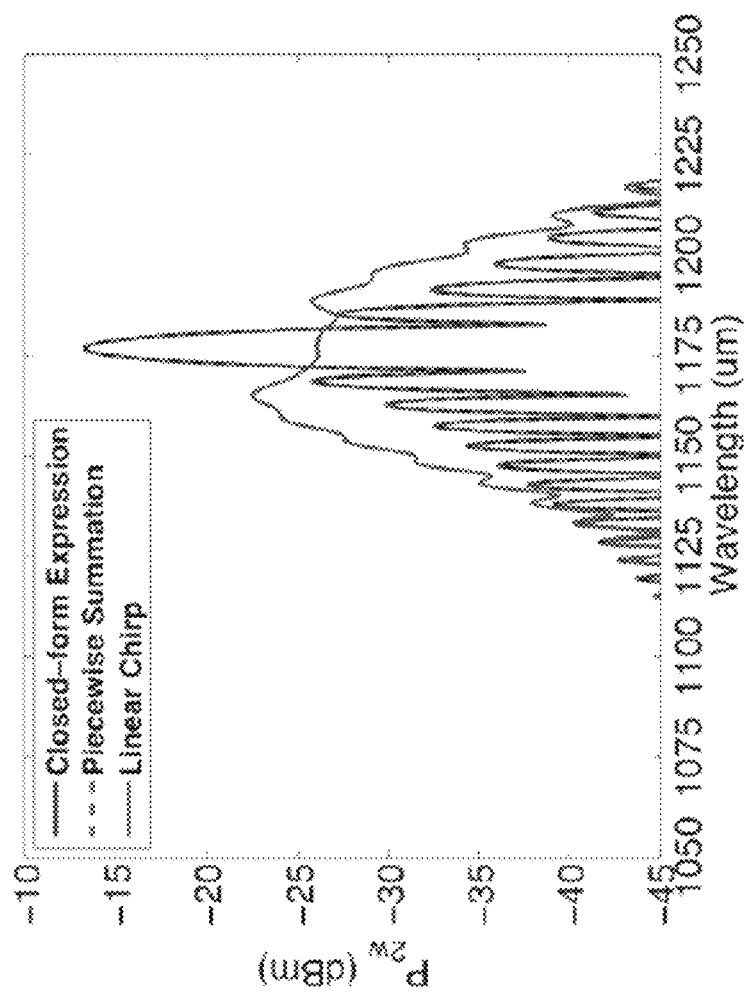
FIG. 27 shows SHG power as a function of wavelength using an SHG generator includes multiple sub arrays having different periods.

FIG. 27 shows SHG power as a function of wavelength when the SHG generator includes multiple sub arrays having different periods, allowing broadband operation and phase matching. The SHG generator can be substantially similar to the apparatus 500 illustrated in FIG. 5.

Figures 28A, 28B:
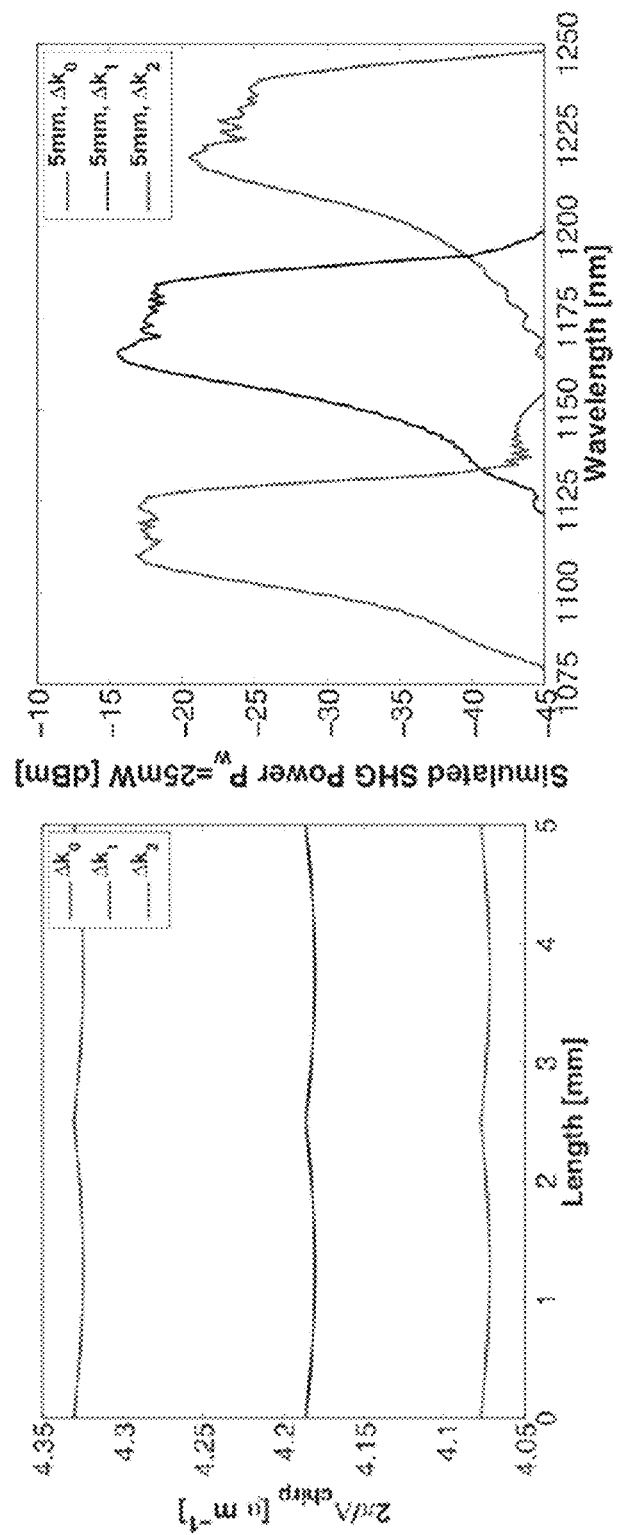
FIG. 28A shows three wave vectors introduced by three sub arrays in the SHG generator illustrated in FIG. 5.
FIG. 28B shows simulated SHG power as a function of wavelength with a pump power at 25 mW in the SHG generator illustrated in FIG. 5.

FIG. 28A shows three wave vectors introduced by three sub arrays in the SHG generator illustrated in FIG. 5. FIG. 28B shows simulated SHG power as a function of wavelength with a pump power at 25 mW. The SHG beam shows three distinct peaks, each of which is generated by a respective phase-matched conversion enabled by a sub array in the SHG generator.

FIGS. 22A-29B demonstrate field-induced second order nonlinear susceptibility in silicon waveguides using CMOS compatible fabrication methods. The origin of this second order nonlinearity is the large third order nonlinear susceptibility of silicon combined with large electric fields generated by p-i-n junctions, breaking the crystalline symmetry of silicon. The DC Kerr effect in silicon is used as an optical phase shifter in multiple MZIs, demonstrating a $V_\pi L$ as low as 2.8 Vcm. A quasi-phase matched EFISHG is demonstrated with a conversion efficiency of $P_{2\omega}/P_\omega^2$=13±0.5%/W at $\lambda_\omega=2\lambda_{2\omega}$=2.29 μm in a 1 mm long ridge silicon waveguide. This corresponds to an effective field-induced $\bar{\chi}^{(2)}$ of 41±1.5 pm/V. When the waveguide width and the spatial period was changed, SHG was measured at multiple wavelengths spanning from $\lambda_\omega=2.16$ μm to $\lambda_\omega=2.42$ μm. The efficiency can be further increased using a longer silicon waveguide. The spectral bandwidth can be also improved by chirping the quasi-phase matching period. Furthermore, the field-induced $\chi^{(2)}$ in silicon can be used in sum and difference frequency generation and electro-optic modulation.

Figures 29A, 29B:
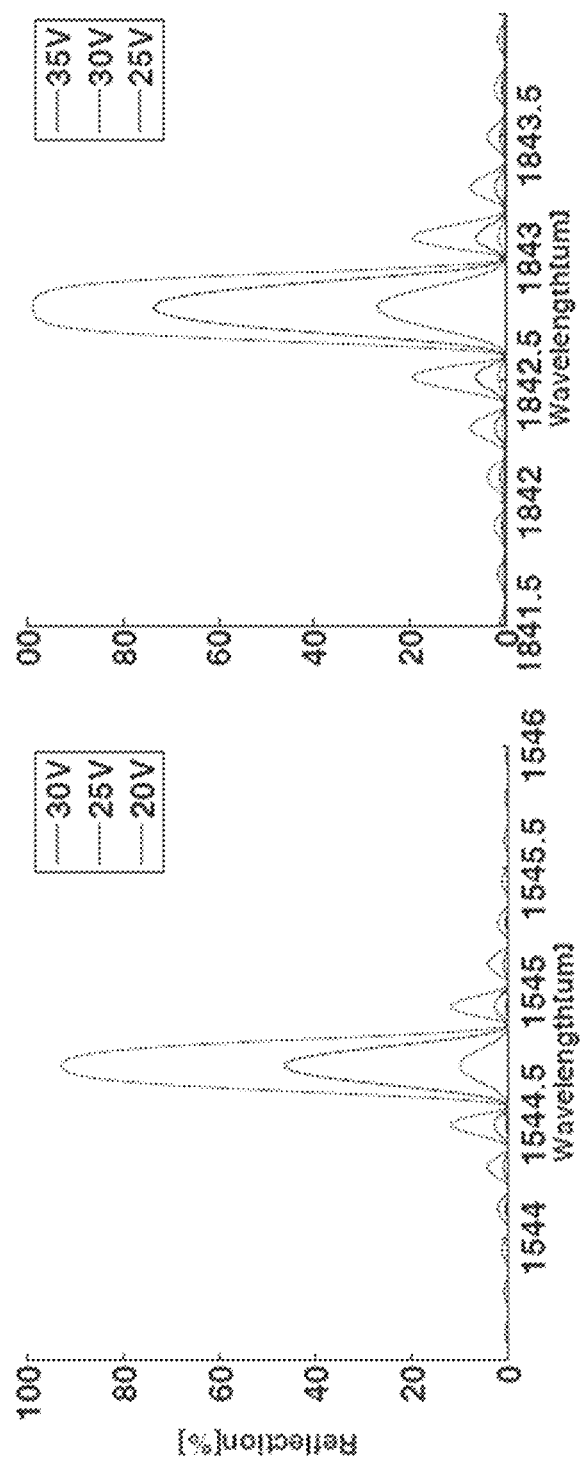
FIGS. 29A and 29B show reflectance of the waveguide illustrated in FIG. 3 as a function of wavelength at different bias voltages.

FIGS. 29A and 29B show reflectance of a waveguide including PIN junctions as a voltage controlled low loss filter and saturable absorber at two different wavelengths of operation. The waveguide can be substantially similar to the apparatus 300 illustrated in FIG. 3. By adjusting the bias voltage from about 20 volts to 30 volts, the reflectance can be adjusted from less than 10% to close to 100%. Therefore, the DC induced Kerr effect with phase matching can be used as an efficient voltage controlled low loss filter and saturable absorber.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of designing and making the technology disclosed herein may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes (outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An apparatus comprising:
    a waveguide comprising a centrosymmetric material to guide at least one light beam, the waveguide comprising:
        a plurality of p-type regions comprising a p-doped centrosymmetric material on a first side of the waveguide; and
        a plurality of n-type regions comprising an n-doped centrosymmetric material on a second side, opposite the first side, of the waveguide;
    a first electrode in electrical communication with the plurality of p-type regions;
    a second electrode, in electrical communication with the plurality of n-type regions, to apply a voltage between the first electrode and the second electrode so as to increase a second order susceptibility of the centrosymmetric material; and
    a first light source, in optical communication with the waveguide, to emit the at least one light beam comprising a first light beam at a first frequency $\omega_1$ and having a first wave vector $k_{\omega 1}$ in the waveguide,
    wherein the waveguide is further configured to guide a second light beam at a second frequency $\omega_2$ and having a second wave vector $k_{\omega 2}$ in the waveguide, and
    wherein the plurality of the p-regions and the plurality of the n-regions are arrayed with a period $\Lambda$ based at least in part on the first wave vector $k_{\omega 1}$ of the first light beam and the second wave vector $k_{\omega 2}$ of the second light beam.

2. The apparatus of claim 1, wherein the centrosymmetric material comprises at least one of silicon or germanium.

3. The apparatus of claim 1, wherein each p-type region in the plurality of the p-type regions and each n-type region in the plurality of n-type regions forms a PIN junction with a corresponding portion of the waveguide.

4. The apparatus of claim 1, wherein the second frequency $\omega_2=2\omega_1$, and the period $\Lambda=2\pi/(2k_{\omega 1}-k_{\omega 2})$.

5. The apparatus of claim 4, wherein the second light beam has a wavelength of about 0.9 µm to about 10 µm.

6. The apparatus of claim 1, further comprising:
    a second light source, in optical communication with the waveguide, to emit the second light beam, the first light beam and the second light beam interacting in the waveguide to generate a third light beam at a third frequency $\omega_3=(\omega_1-\omega_2)$ and having a third wave vector $k_{\omega 3}$ in the waveguide,
    wherein the period $\Lambda=2\pi/((k_{\omega 1}+k_{\omega 2})-k_{\omega 3})$.

7. The apparatus of claim 1, further comprising:
a second light source, in optical communication with the waveguide, to provide the second light beam so as to generate a third light beam at a third frequency $\omega_3=(\omega_1-\omega_2)$ and having a third wave vector $k_{\omega 3}$ in the waveguide.

8. The apparatus of claim 1, further comprising:
a voltage source, in electrical communication with the first electrode and the second electrode, to apply an alternating current voltage having an electrical frequency electrical so as to generate the second light beam,
wherein $\omega_2=(\omega_1+\omega_{electrical})$ and $\Lambda=2\pi/((k_{\omega 1}+k_{electrical})-k_{\omega 2})$.

9. The apparatus of claim 1, wherein the period $\Lambda$ is about 100 nm to about 10 mm.

10. The apparatus of claim 1, wherein the plurality of p-type regions comprises a first periodic array of p-type regions having a first period and a second periodic array of p-type regions having a second period.

11. The apparatus of claim 1, wherein the plurality of p-type regions further comprises at least one p-type region on the second side of the waveguide and the plurality of n-type regions further comprises at least one n-type region on the first side of the waveguide.

12. The apparatus of claim 1, wherein the n-type material comprises the centrosymmetric material doped with an n-type dopant and the p-type material comprises the centrosymmetric material doped with a p-type dopant.

13. The apparatus of claim 12, wherein at least one of the n-type dopant or the p-type dopant has a concentration of about $10^{15}/cm^3$ to about $10^{20}$ $cm^3$.

14. The apparatus of claim 1, further comprising:
a voltage source, in electrical communication with the first electrode and the second electrode, to supply the voltage of about 1 V to about 100 V.

15. A method comprising:
guiding at least one light beam in a waveguide formed of centrosymmetric material, the waveguide comprising:
a plurality of p-type regions comprising a p-type material on a first side of the waveguide; and
a plurality of n-type regions comprising an n-type material on a second side, opposite the first side, of the waveguide;
applying a voltage between the plurality of p-type regions and the plurality of n-type regions to increase a second order susceptibility of the centrosymmetric material; and
wherein guiding the at least one light beam comprises:
guiding a first light beam at a first frequency $\omega_1$ and having a first wave vector $k_{\omega 1}$ in the waveguide; and
guiding a second light beam at a second frequency $\omega_2$ and having a second wave vector $k_{\omega 2}$ in the waveguide,
wherein at least one of the plurality of the p-type regions or the plurality of the n-type regions has a period $\Lambda$ based at least in part on the first wave vector $k_{\omega 1}$ of the first light beam and the second wave vector $k_{\omega 2}$ of the second light beam.

16. The method of claim 15, wherein the second frequency $\omega_2=2\omega_1$, the period $\Lambda=2\pi/(2k_{\omega 1}-k_{\omega 2})$, and the method further comprises:
generating the second light beam from the first light beam via second harmonic generation within the waveguide.

17. The method of claim 16, wherein generating the second light beam comprises generating light at a wavelength of about 1 μm to about 10 μm.

18. The method of claim 15, further comprising:
generating a third light beam from the first light beam and the second light beam at a third frequency $\omega_3=(\omega_1-\omega_2)$ and having a third wave vector $k_{\omega 3}$ in the waveguide via difference frequency generation, and
wherein the period $\Lambda=2\pi/((k_{\omega 1}+k_{\omega 2})-k_{\omega 3})$.

19. The method of claim 15, further comprising:
generating the third light beam from the first light beam and the second light beam at a third frequency $\omega_3=(\omega_1+\omega_2)$ and having a third wave vector $k_{\omega 3}$ in the waveguide via sum frequency generation with the period $\Lambda$ of the at least one of the plurality of the p-regions or the plurality of the n-regions as $\Lambda=2\pi/((k_{\omega 1}+k_{\omega 2})-k_{\omega 3})$.

20. The method of claim 15, wherein guiding the first light beam comprises:
guiding the first light beam through a first region of the waveguide including a first periodic array of p-type regions having a first period; and
guiding the first light beam through a second region of the waveguide including a second periodic array of p-type regions having a second period.

21. The method of claim 15, wherein guiding the first light beam comprises:
guiding the first light beam through at least one portion of the waveguide including at least one second p-type region on the second side and at least one n-type region on the first side.

22. The method of claim 15, wherein the n-type material comprises the centrosymmetric material doped with an n-type dopant and the p-type material comprises the centrosymmetric material doped with a p-type dopant, and the method further comprises:
changing at least one of a first doping concentration of the n-type dopant or a second doping concentration of the p-type dopant.

23. The method of claim 22, wherein changing the at least one of the first doping concentration or the second doping concentration comprises changing the at least one of the first doping concentration or the second doping concentration to about $10^{17}/cm^3$ to about $10^{19}/cm^3$.

24. The method of claim 15, wherein applying the voltage between the plurality of p-type regions and the plurality of n-type regions comprises applying about 5 V to about 21 V between the plurality of p-type regions and the plurality of n-type regions.

25. An apparatus comprising:
a light source to emit a pump beam having a first frequency $\omega$ and a first wave vector $k_\omega$;
a silicon waveguide, in optical communication with the light source, to guide the pump beam and to guide a signal beam having a second frequency $\omega_2$ and a second wave vector $k_{\omega 2}$, the silicon waveguide comprising:
a plurality of p-type regions arrayed at a period $\Lambda$ on a first side of the silicon waveguide, the period $\Lambda$ based at least in part on the first wave vector $k_{\omega 1}$ and the second wave vector $k_{\omega 2}$, and
a plurality of n-type regions arrayed at the period $\Lambda$ on a second side, opposite the first side, of the silicon waveguide so as to form a plurality of PIN junctions with the silicon waveguide;
a first electrode in electrical communication with the plurality of p-type regions; and
a second electrode, in electrical communication with the plurality of n-type regions, to apply a voltage to the plurality of PIN junctions, the voltage increasing a second order susceptibility of the silicon waveguide.

* * * * *